Figure 1:
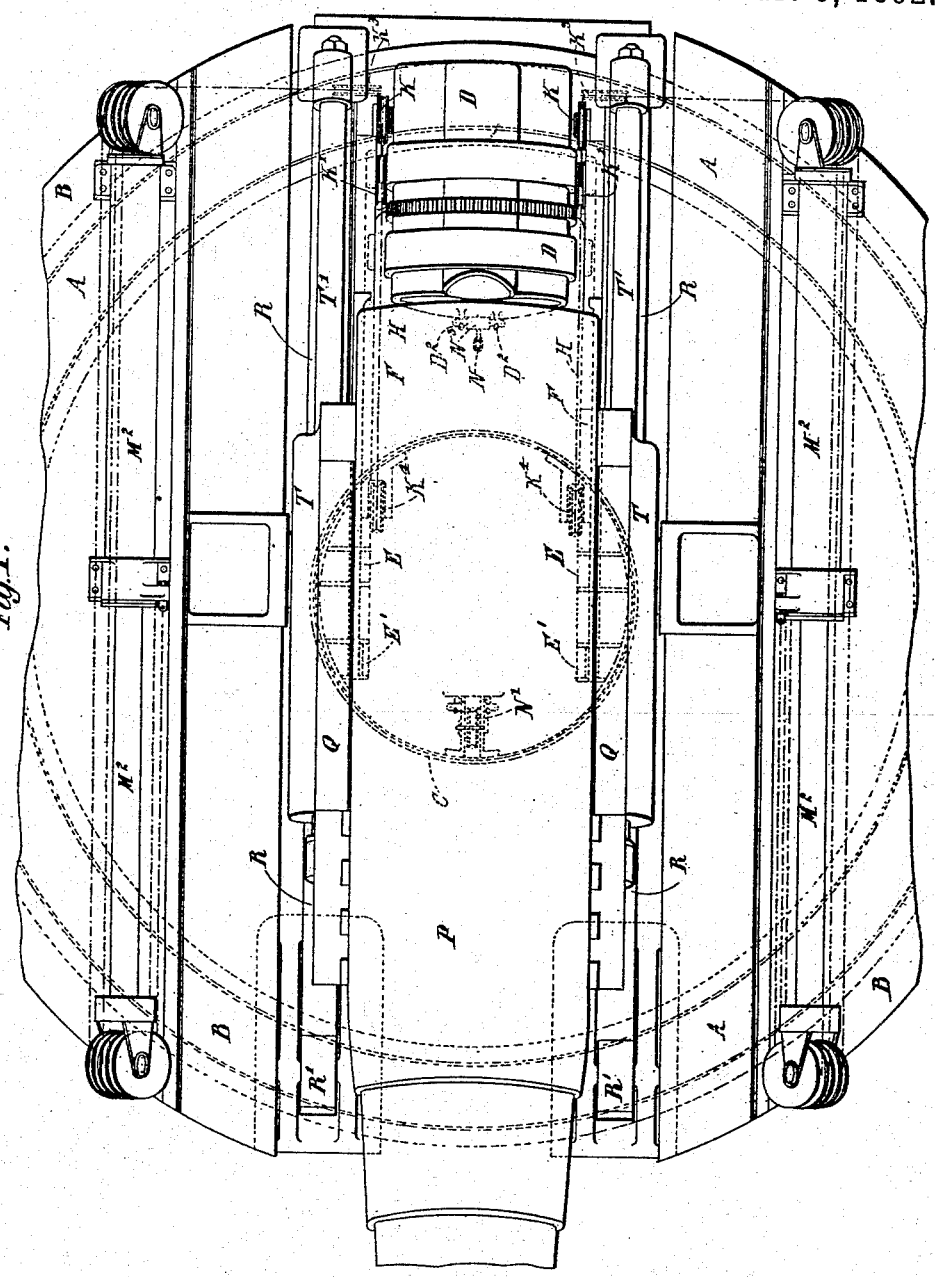

(No Model.) 38 Sheets—Sheet 1.

J. B. G. A. CANET.
APPARATUS FOR LOADING GUNS.

No. 470,285. Patented Mar. 8, 1892.

(No Model.) 38 Sheets—Sheet 2.
J. B. G. A. CANET.
APPARATUS FOR LOADING GUNS.
No. 470,285. Patented Mar. 8, 1892.

J. B. G. A. CANET.
APPARATUS FOR LOADING GUNS.

No. 470,285. Patented Mar. 8, 1892.

(No Model.)  J. B. G. A. CANET.  38 Sheets—Sheet 9.
APPARATUS FOR LOADING GUNS.

No. 470,285. Patented Mar. 8, 1892.

Witnesses:  Inventor:

(No Model.)  38 Sheets—Sheet 10.

J. B. G. A. CANET.
APPARATUS FOR LOADING GUNS.

No. 470,285.  Patented Mar. 8, 1892.

(No Model.) 38 Sheets—Sheet 13.
J. B. G. A. CANET.
APPARATUS FOR LOADING GUNS.

No. 470,285. Patented Mar. 8, 1892.

(No Model.)

38 Sheets—Sheet 14.

J. B. G. A. CANET.
APPARATUS FOR LOADING GUNS.

No. 470,285.

Patented Mar. 8, 1892.

(No Model.)

J. B. G. A. CANET.
APPARATUS FOR LOADING GUNS.

No. 470,285.

38 Sheets—Sheet 15.

Patented Mar. 8, 1892.

(No Model.)  38 Sheets—Sheet 16.

J. B. G. A. CANET.
APPARATUS FOR LOADING GUNS.

No. 470,285. Patented Mar. 8, 1892.

(No Model.) 38 Sheets—Sheet 18.

J. B. G. A. CANET.
APPARATUS FOR LOADING GUNS.

No. 470,285. Patented Mar. 8, 1892.

(No Model.) 38 Sheets—Sheet 19.
J. B. G. A. CANET.
APPARATUS FOR LOADING GUNS.

No. 470,285. Patented Mar. 8, 1892.

(No Model.) 38 Sheets—Sheet 20.

J. B. G. A. CANET.
APPARATUS FOR LOADING GUNS.

No. 470,285. Patented Mar. 8, 1892.

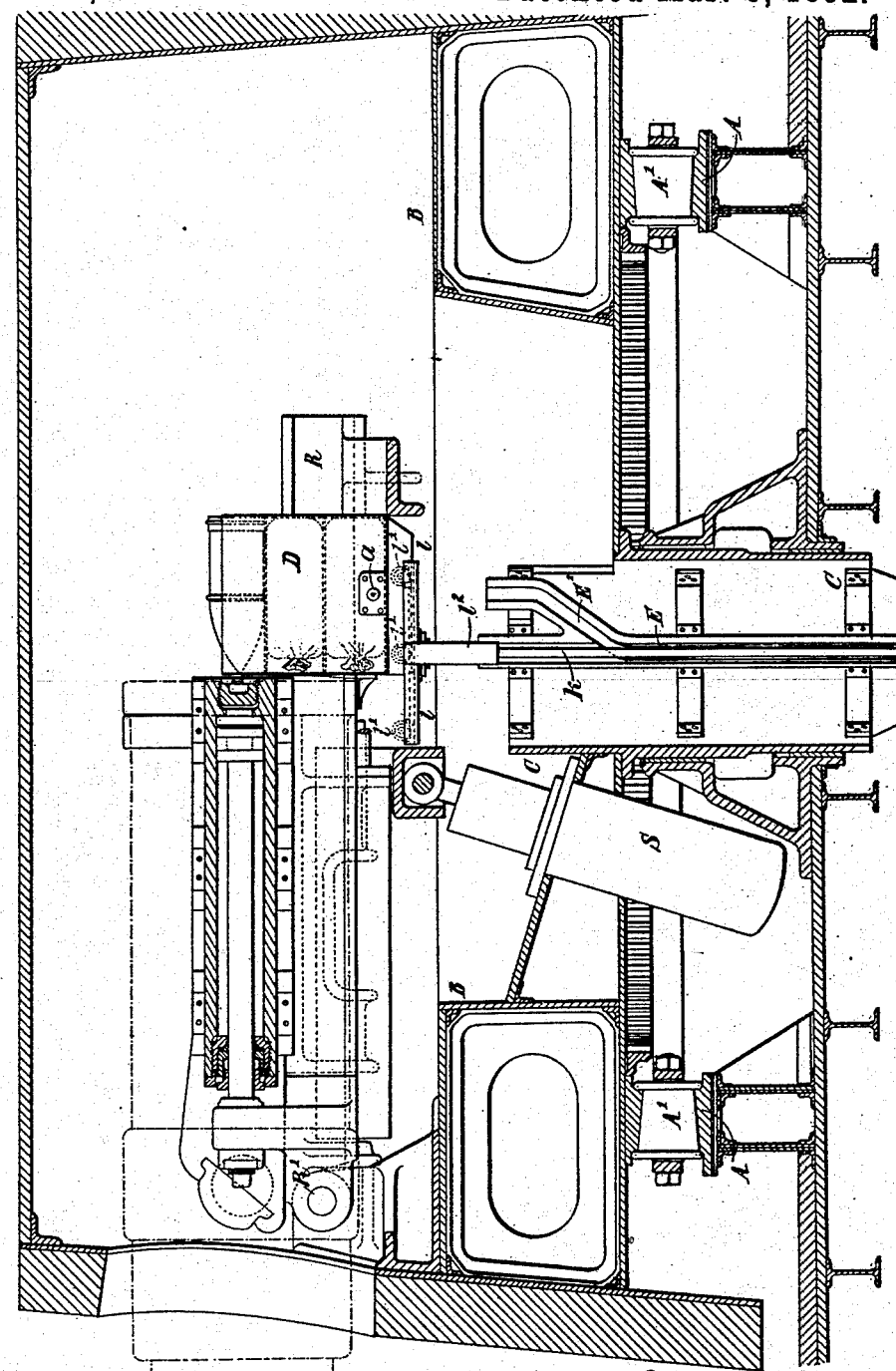

(No Model.)
J. B. G. A. CANET.
APPARATUS FOR LOADING GUNS.
No. 470,285. Patented Mar. 8, 1892.
38 Sheets—Sheet 22.
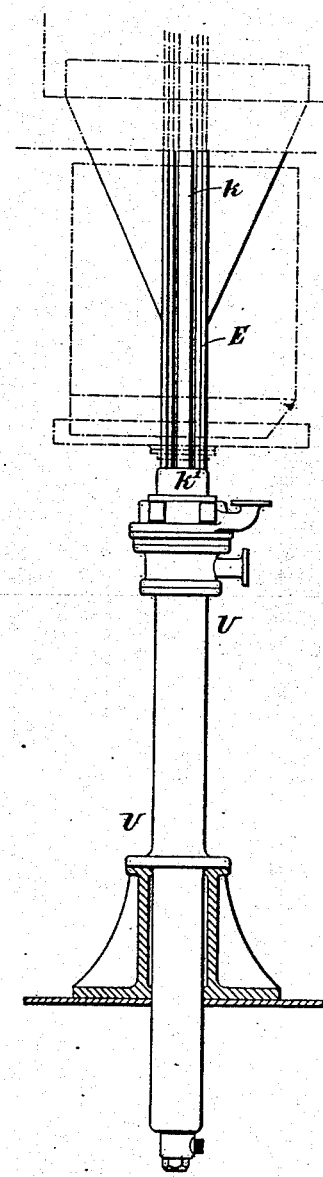
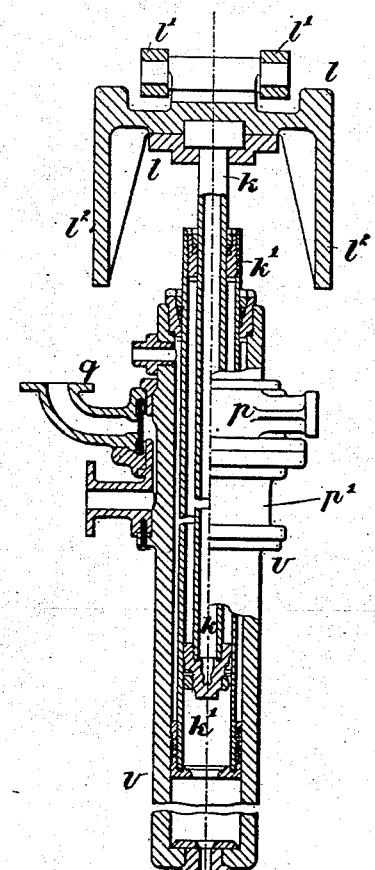
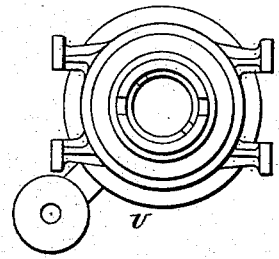

(No Model.) 38 Sheets—Sheet 23.
J. B. G. A. CANET.
APPARATUS FOR LOADING GUNS.
No. 470,285. Patented Mar. 8, 1892.
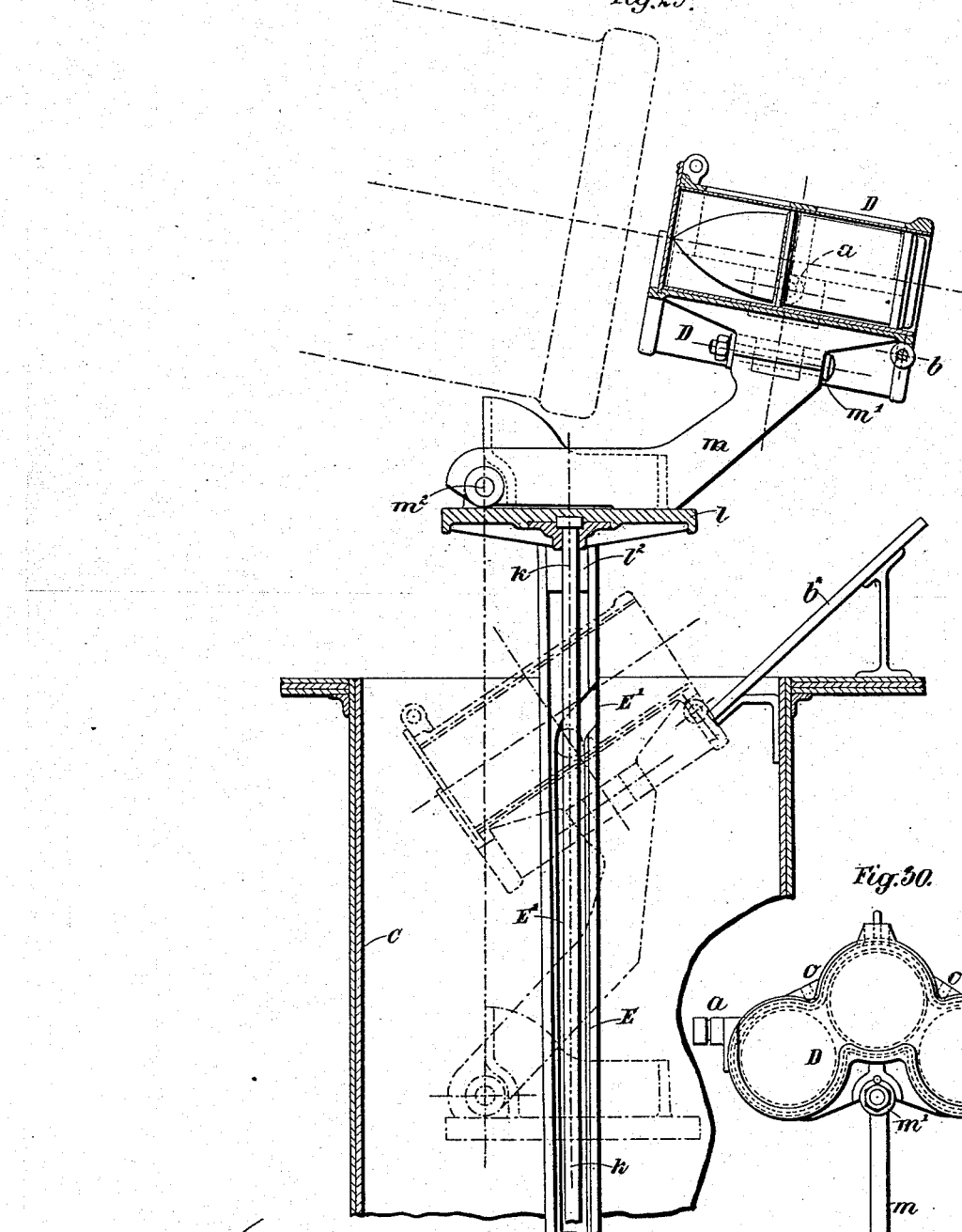
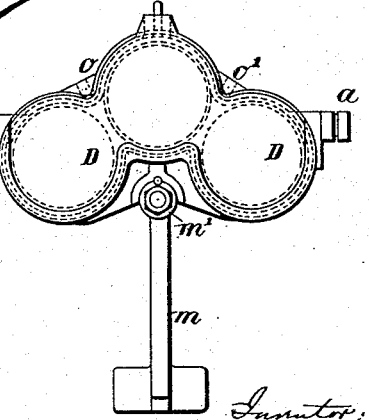

(No Model.)

J. B. G. A. CANET.
APPARATUS FOR LOADING GUNS.

No. 470,285.

38 Sheets—Sheet 24.

Patented Mar. 8, 1892.

(No Model.)

J. B. G. A. CANET.
APPARATUS FOR LOADING GUNS.

No. 470,285.

38 Sheets—Sheet 25.

Patented Mar. 8, 1892.

Witnesses:
J. A. Rutherford.
Percy B. Hills.

Inventor:
Jean B. G. A. Canet
By James L. Norris
Atty.

(No Model.) 38 Sheets—Sheet 26.
J. B. G. A. CANET.
APPARATUS FOR LOADING GUNS.
No. 470,285. Patented Mar. 8, 1892.
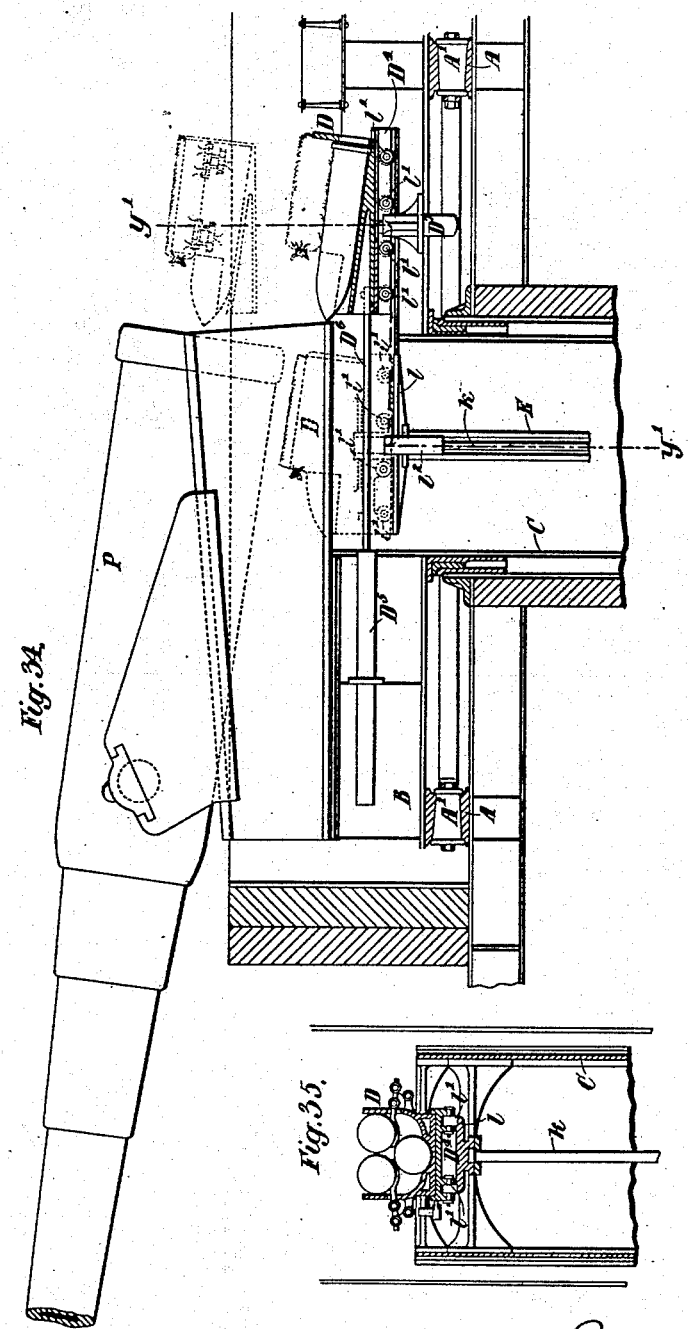

(No Model.) J. B. G. A. CANET.
APPARATUS FOR LOADING GUNS.
No. 470,285. Patented Mar. 8, 1892.
38 Sheets—Sheet 27.
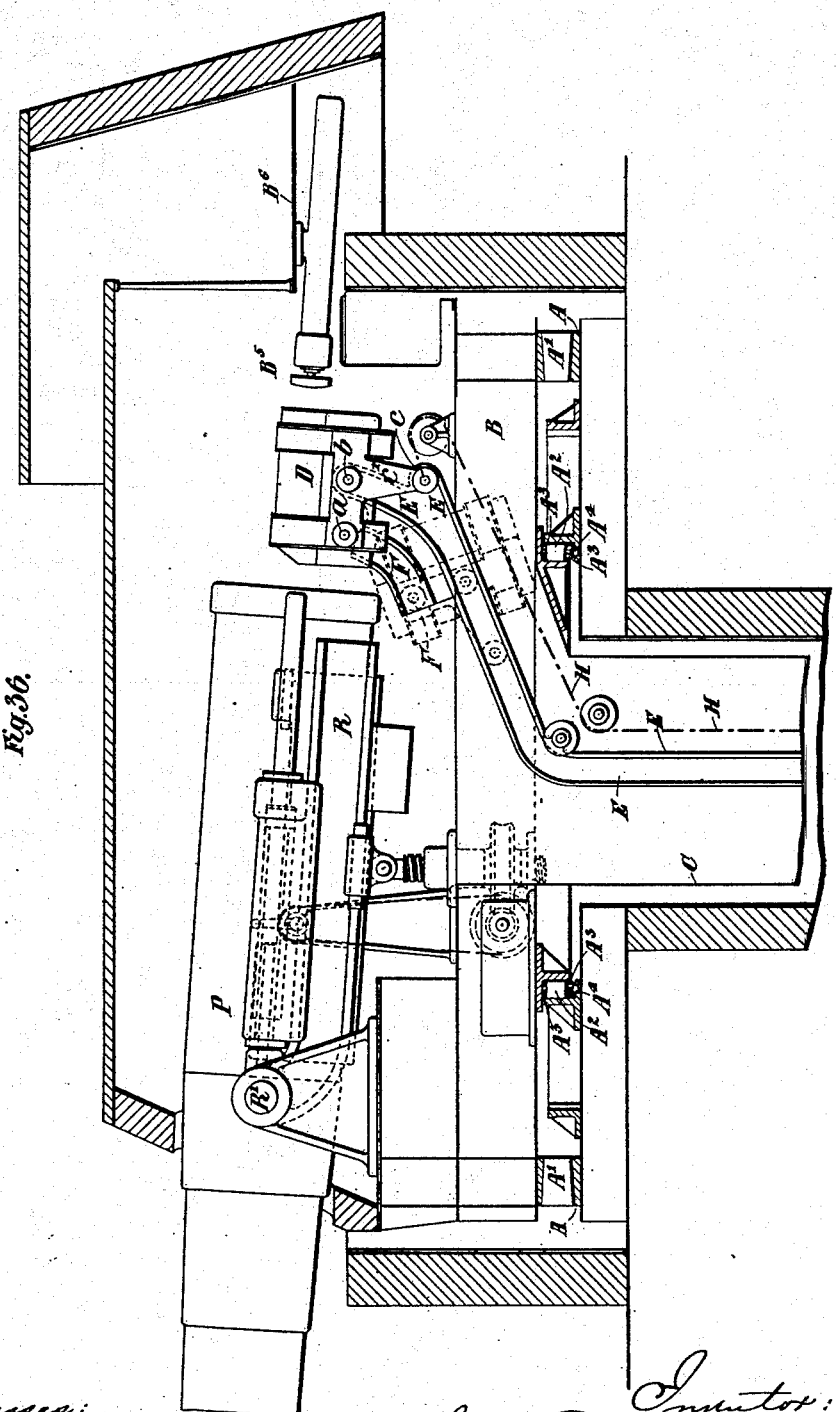

(No Model.) 38 Sheets—Sheet 28.
J. B. G. A. CANET.
APPARATUS FOR LOADING GUNS.

No. 470,285. Patented Mar. 8, 1892.

(No Model.)

38 Sheets—Sheet 29.

J. B. G. A. CANET.
APPARATUS FOR LOADING GUNS.

No. 470,285.  Patented Mar. 8, 1892.

(No Model.) 38 Sheets—Sheet 33.
J. B. G. A. CANET.
APPARATUS FOR LOADING GUNS.

No. 470,285. Patented Mar. 8, 1892.

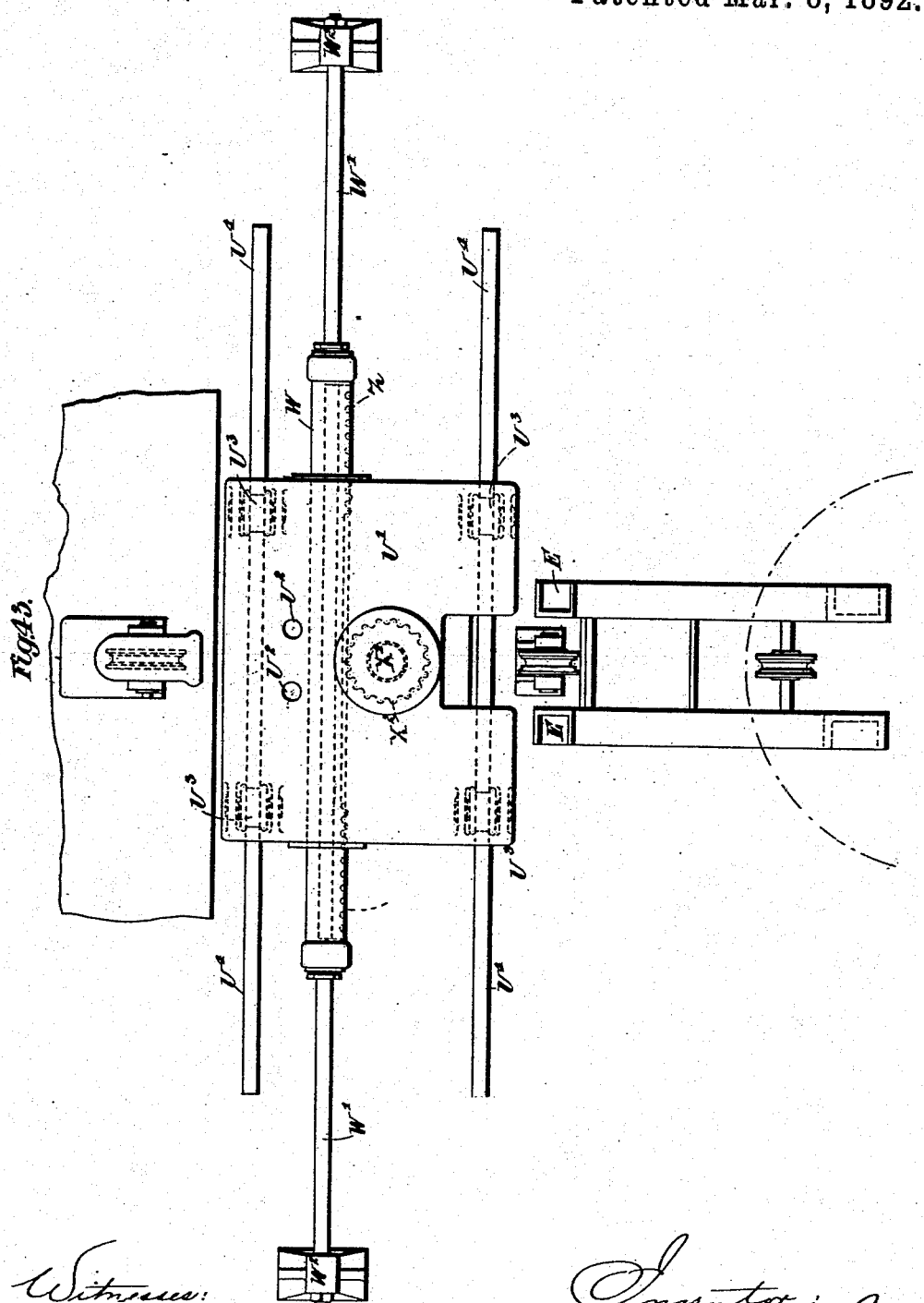

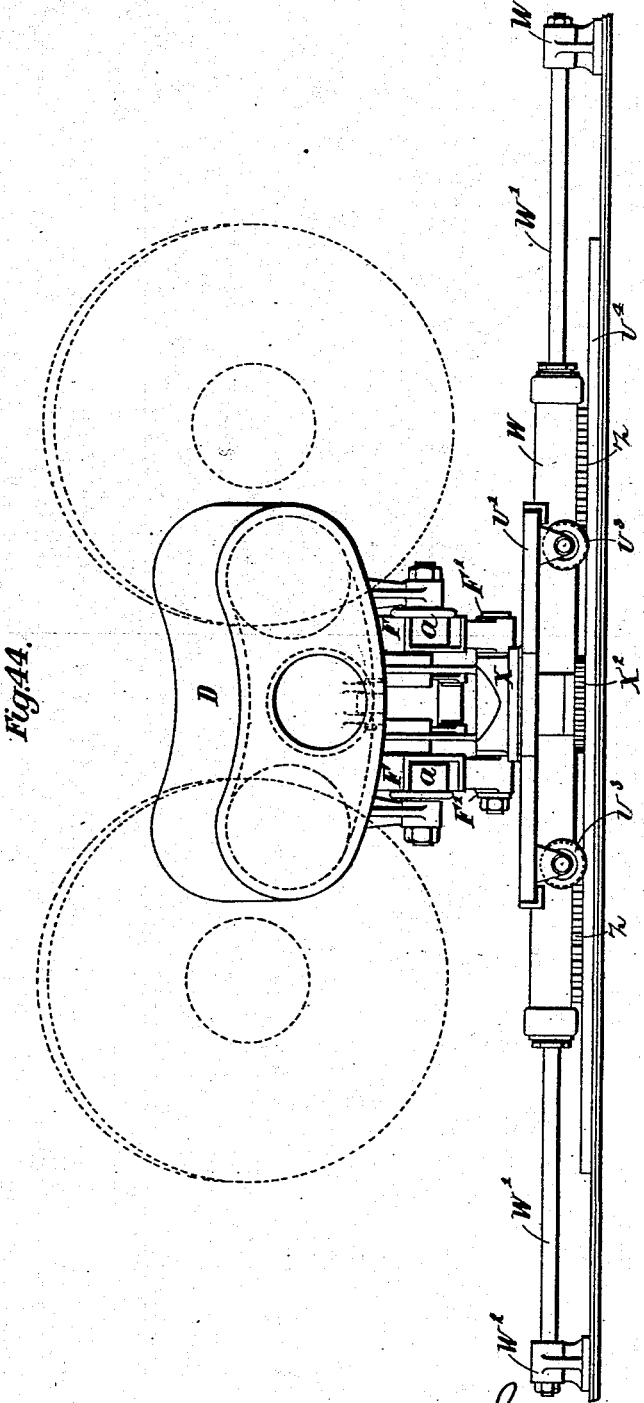

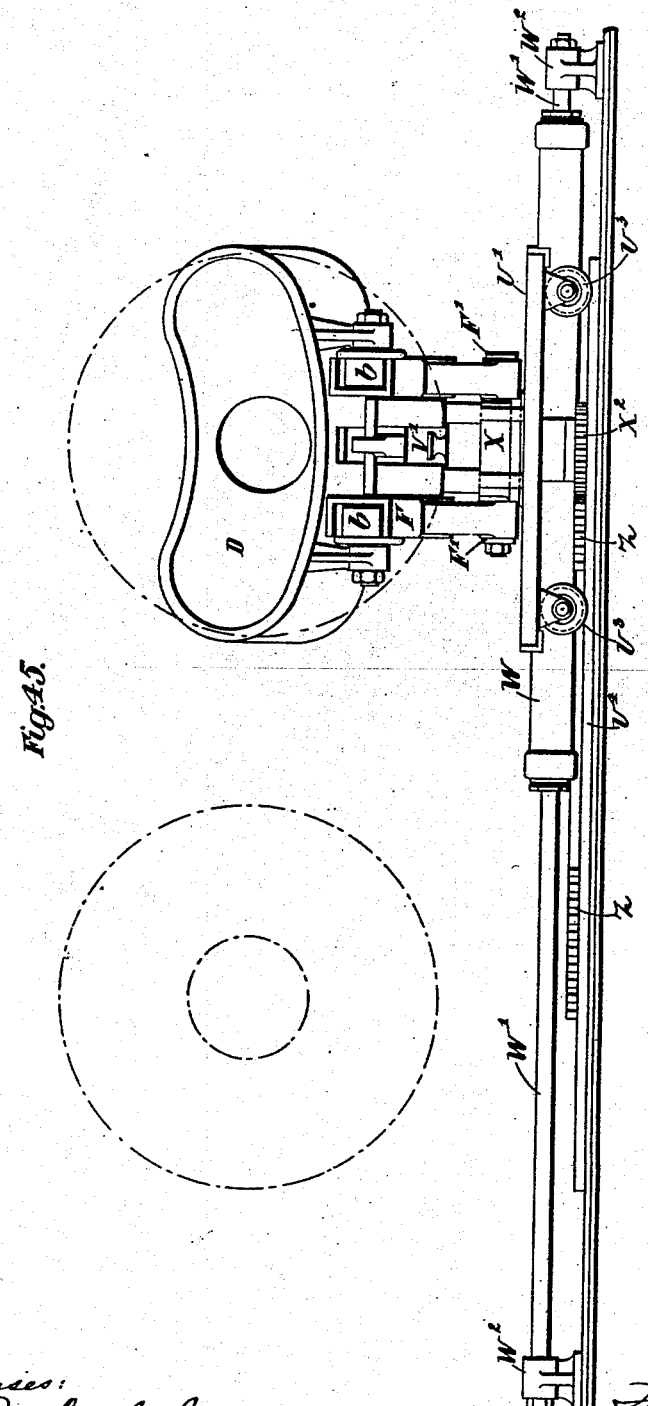

(No Model.)  38 Sheets—Sheet 37.
J. B. G. A. CANET.
APPARATUS FOR LOADING GUNS.
No. 470,285.  Patented Mar. 8, 1892.
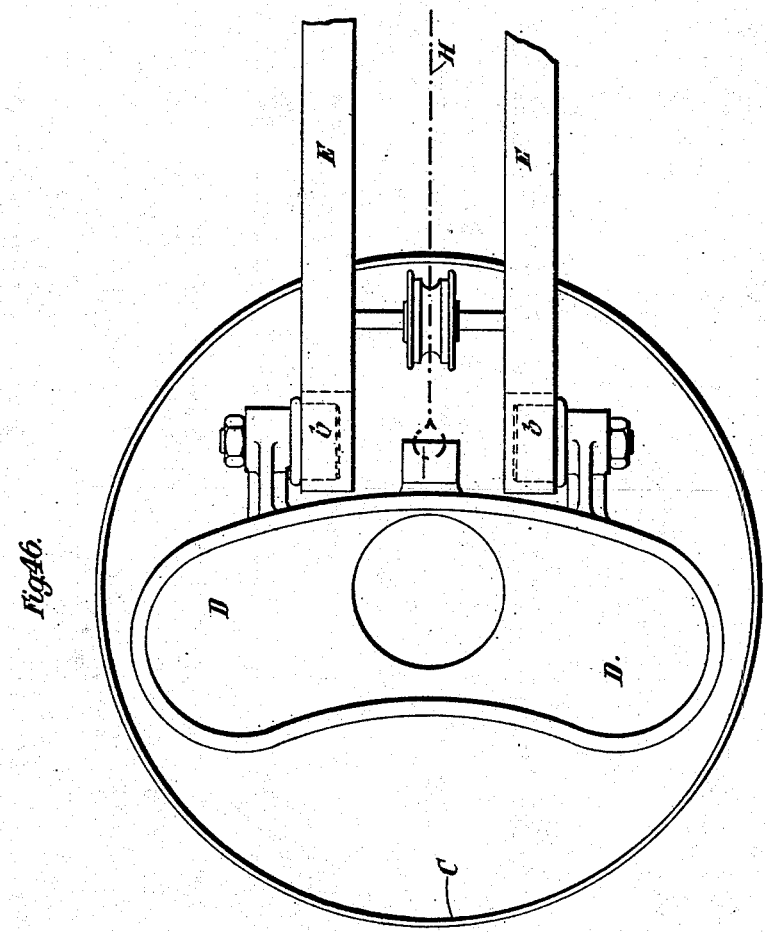

(No Model.)
J. B. G. A. CANET.
APPARATUS FOR LOADING GUNS.
No. 470,285. Patented Mar. 8, 1892.
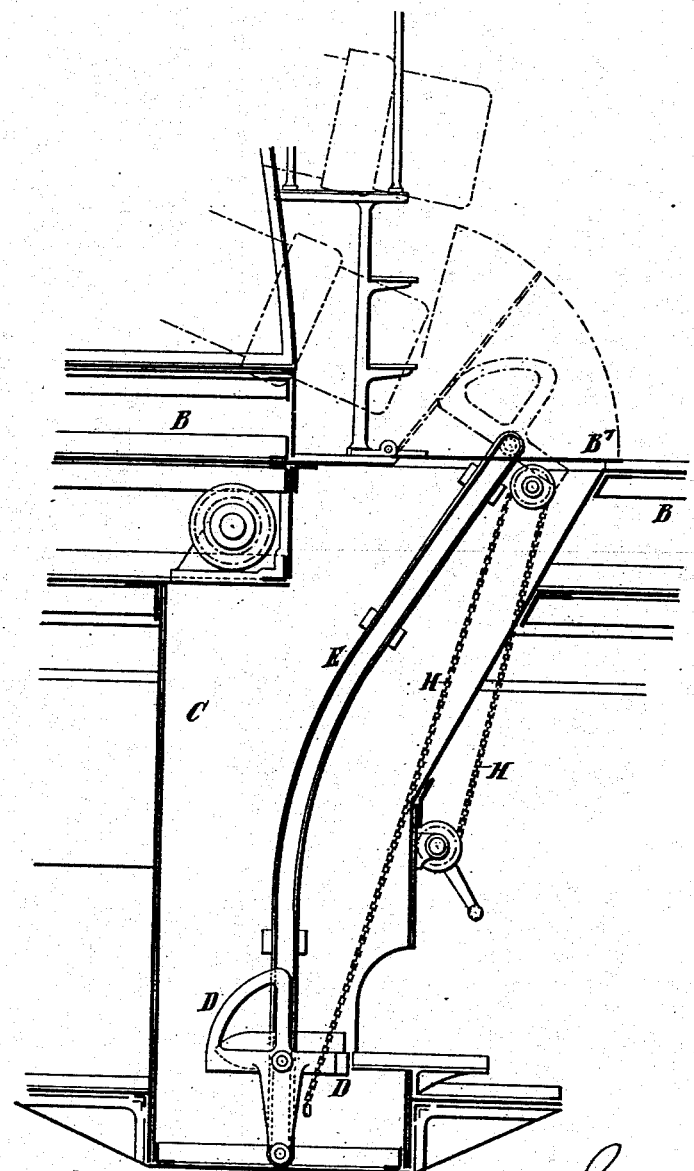

UNITED STATES PATENT OFFICE.

JEAN BAPTISTE GUSTAVE ADOLPHE CANET, OF PARIS, FRANCE, ASSIGNOR OF ONE-HALF TO THE SIR JOSEPH WHITWORTH & COMPANY, LIMITED, OF OPENSHAW, ENGLAND.

APPARATUS FOR LOADING GUNS.

SPECIFICATION forming part of Letters Patent No. 470,285, dated March 8, 1892.

Application filed March 6, 1889. Serial No. 302,062. (No model.) Patented in France September 4, 1883, No. 157,389; in England January 2, 1884, No. 279; December 20, 1884, No. 16,736; July 1, 1887, No. 9,375, and July 20, 1887, No. 10,179; in Germany October 2, 1884, No. 28,701, and in Spain August 3, 1887, No. 7,245.

*To all whom it may concern:*

Be it known that I, JEAN BAPTISTE GUSTAVE ADOLPHE CANET, civil engineer, a citizen of the Republic of France, and a resident of Paris, France, have invented new and useful Improvements in Apparatus for Loading Guns, (for which I have obtained patents in Great Britain, No. 279, bearing date January 2, 1884; No. 16,736, bearing date December 20, 1884; No. 9,375, bearing date July 1, 1887, and No. 10,179, bearing date July 20, 1887; in France, No. 157,389, bearing date September 4, 1883, and certificate of addition bearing date August 4, 1884; in Spain, Nos. 7,245 and 11,776, Fol. 454, bearing date August 3, 1887, and in Germany, No. 28,701, bearing date October 2, 1884,) of which the following is a specification, reference being had to the accompanying drawings.

My invention is designed to simplify and facilitate the operations necessary in the loading of guns mounted on rotating platforms or turn-tables and to afford the means whereby the loading of a gun so mounted may be effected in any position to which it may be trained or while being trained—for instance, while following the movements of a vessel.

An essential feature of my said invention is the combination, with the rotating platform or turn-table of the gun-mounting, of guides which extend downward from the center thereof and are preferably arranged to rotate therewith and in or between which the ammunition may be raised from a magazine or deck and brought into position behind the breech of the gun, so that it can be rammed therein by hand or by any suitable mechanism. I usually combine with the vertical guides a central tube, which incloses the said guides and which is attached to and movable with the platform or turn-table and forms a pivot therefor.

My said invention, moreover, comprises various improvements in the details of construction, as hereinafter set forth.

Figure 2:
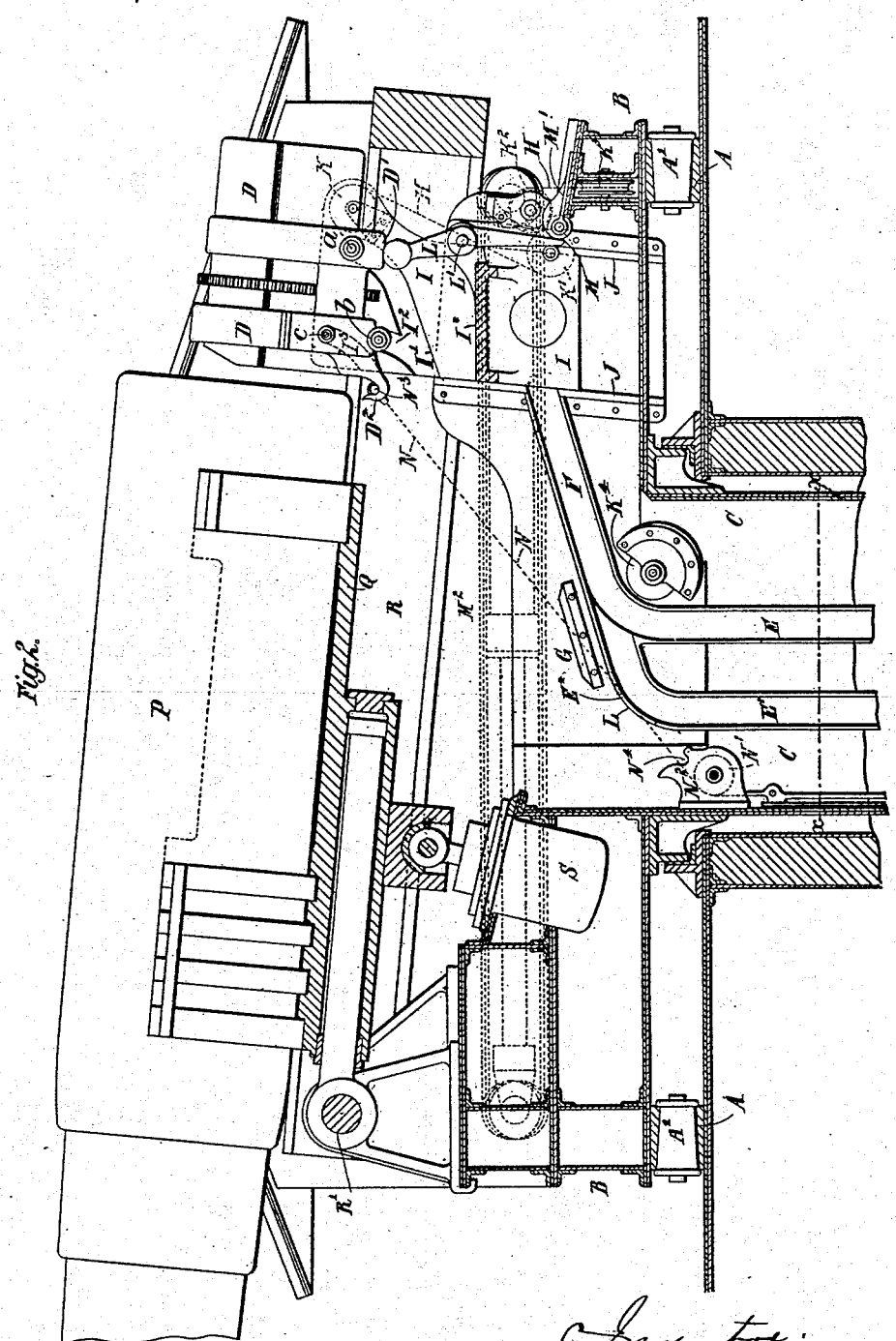
Figure 3:
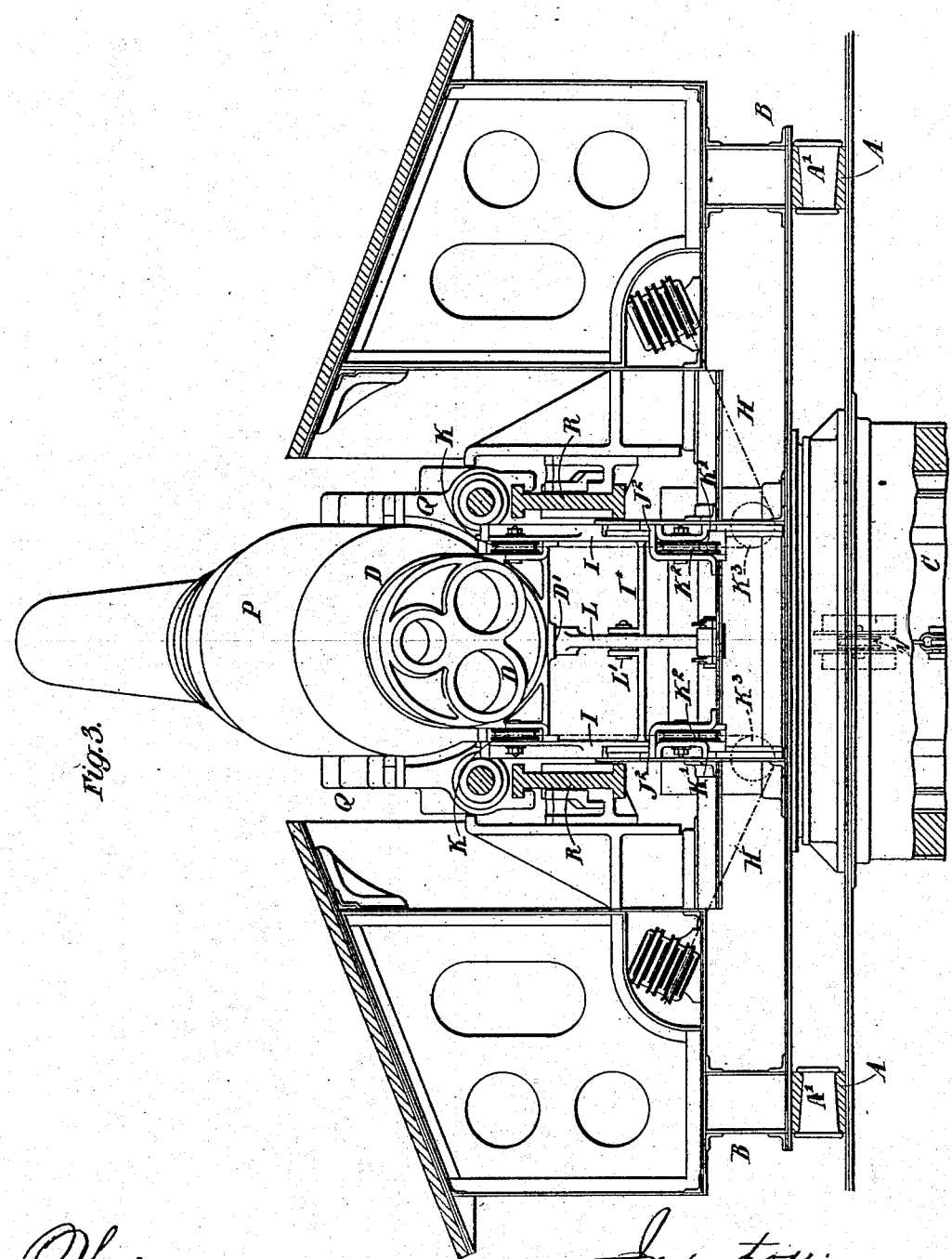
Figure 4:
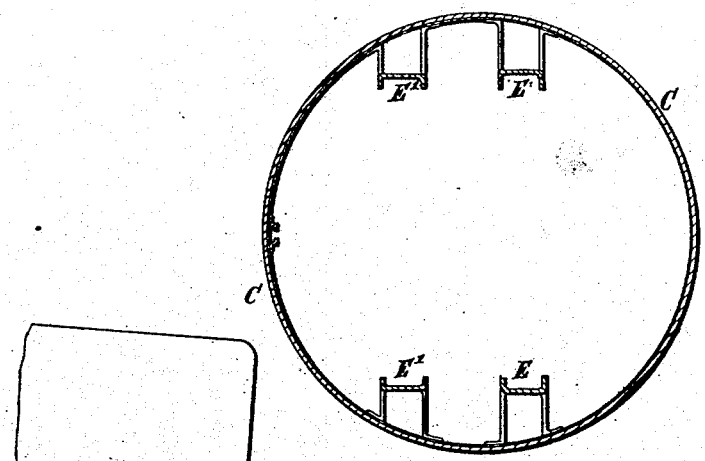
Figure 5:
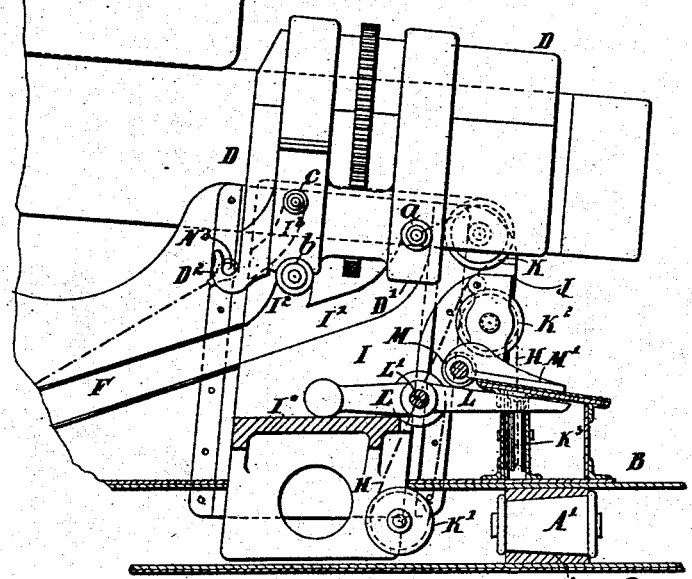
Figure 6:
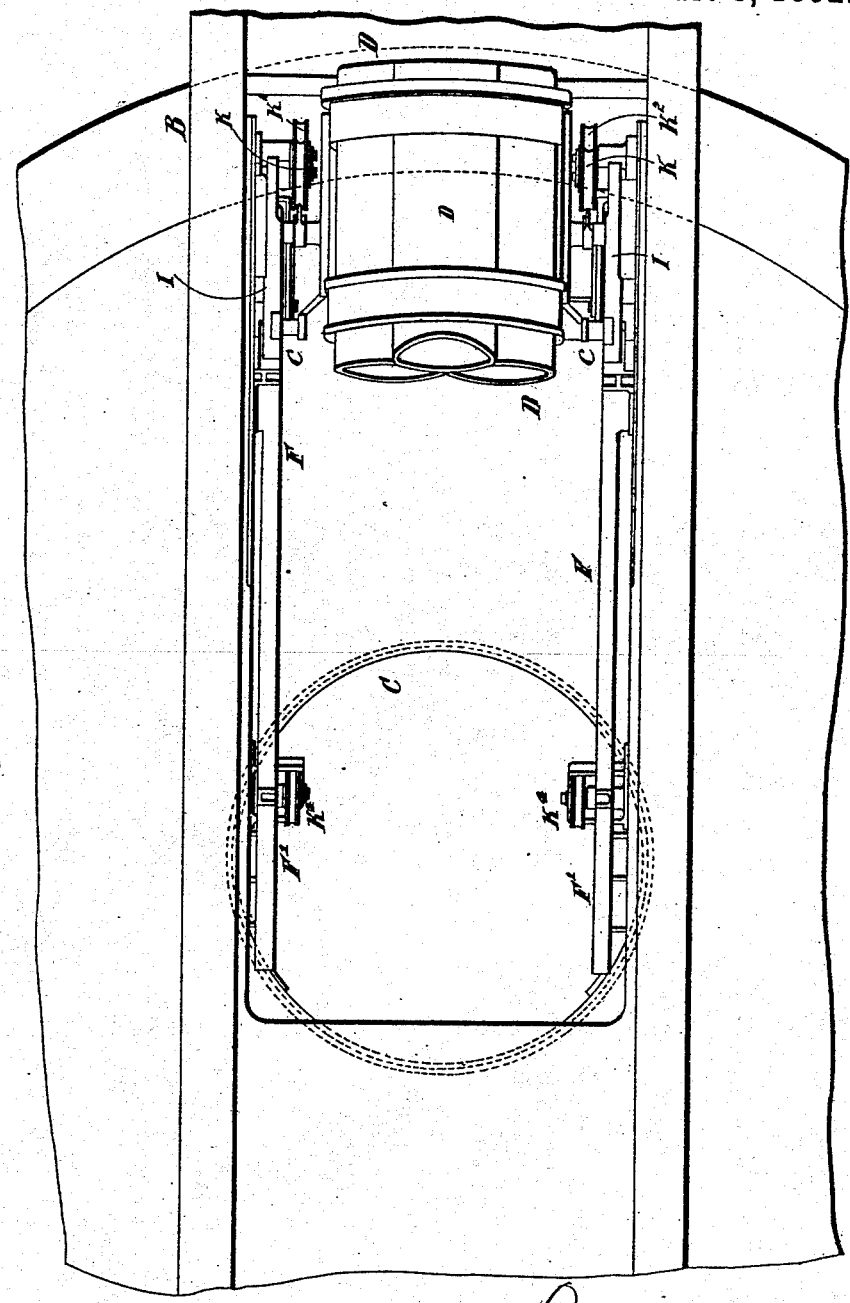
Figure 7:
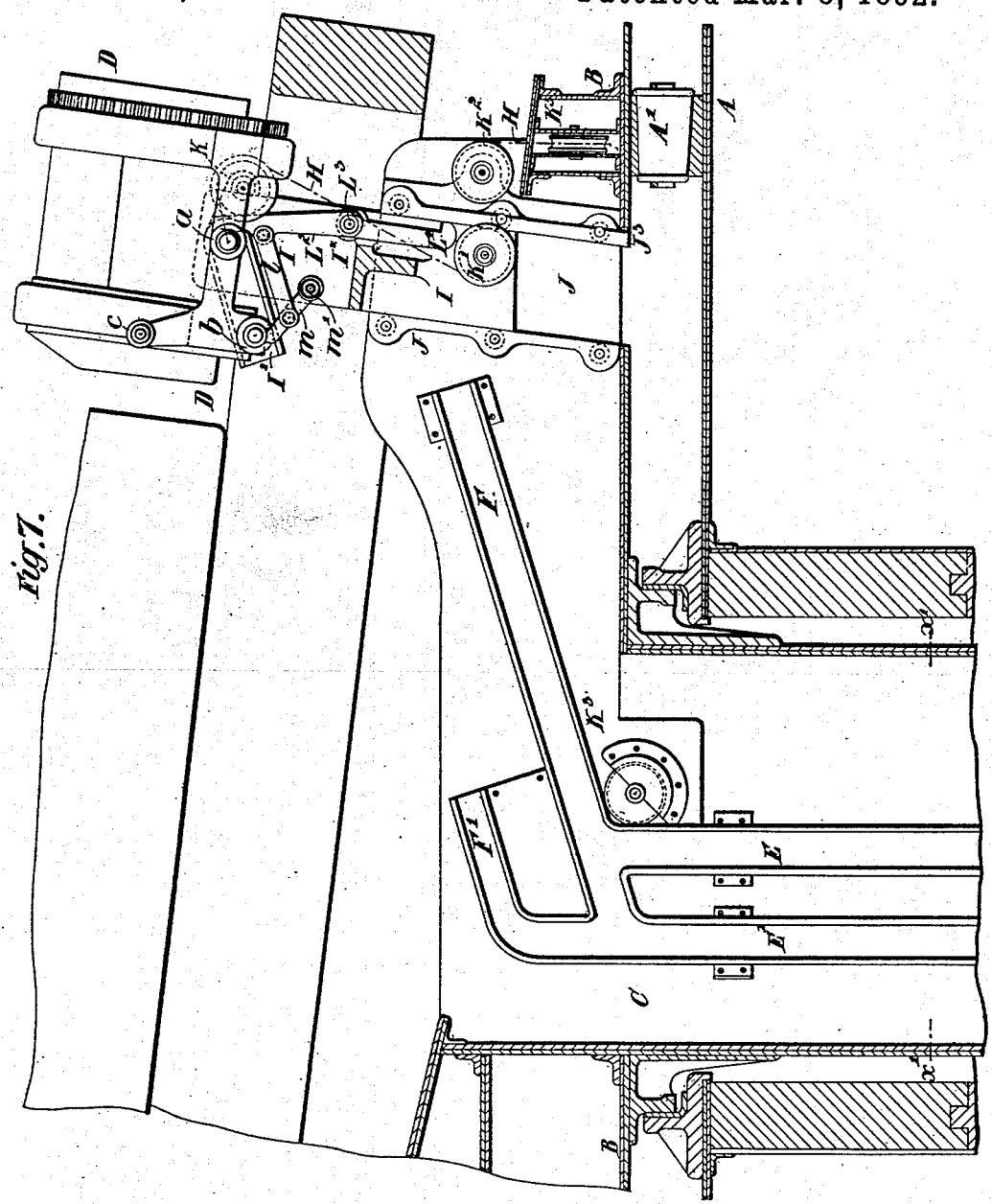
Figure 8:
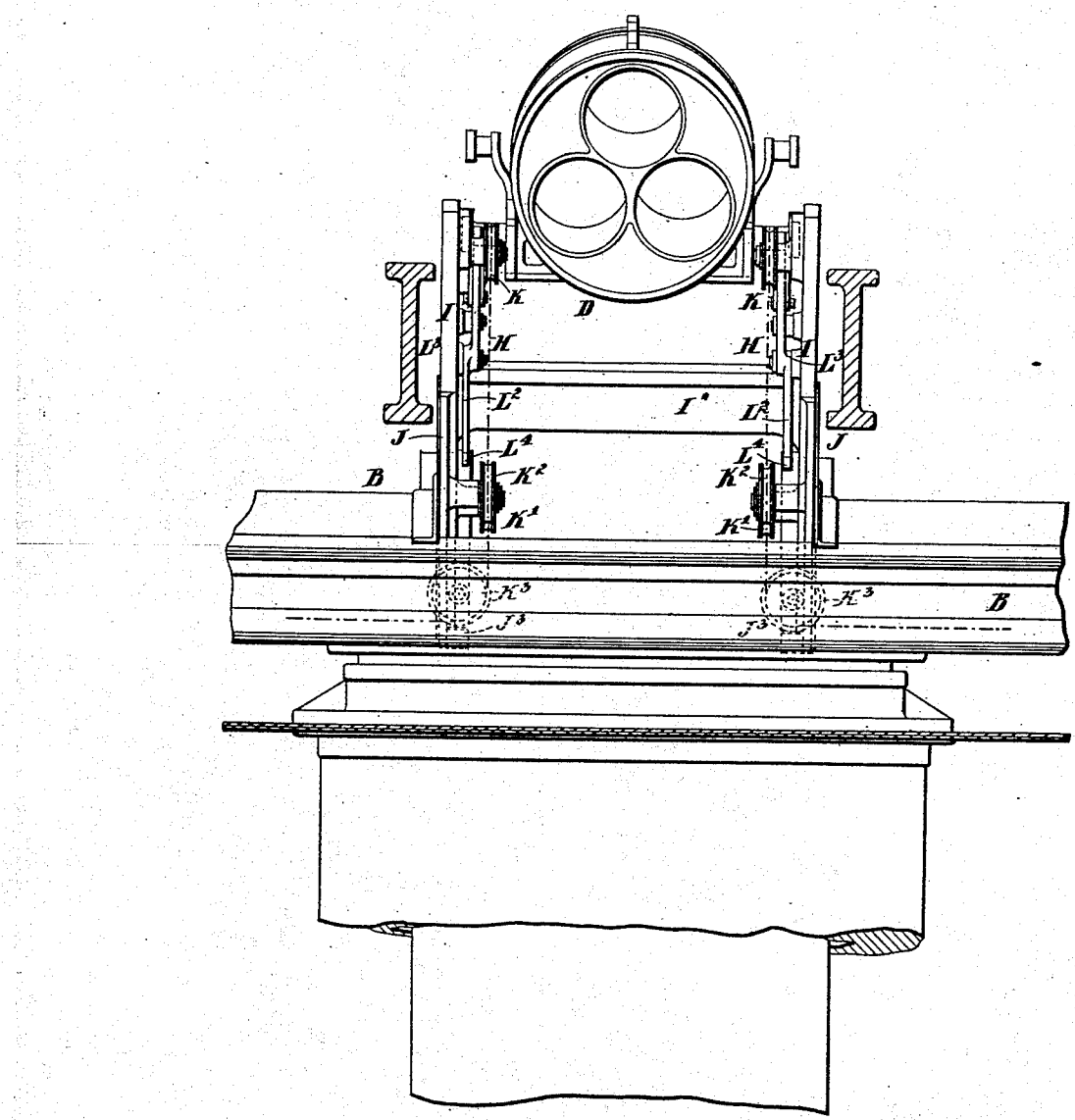
Figure 9:
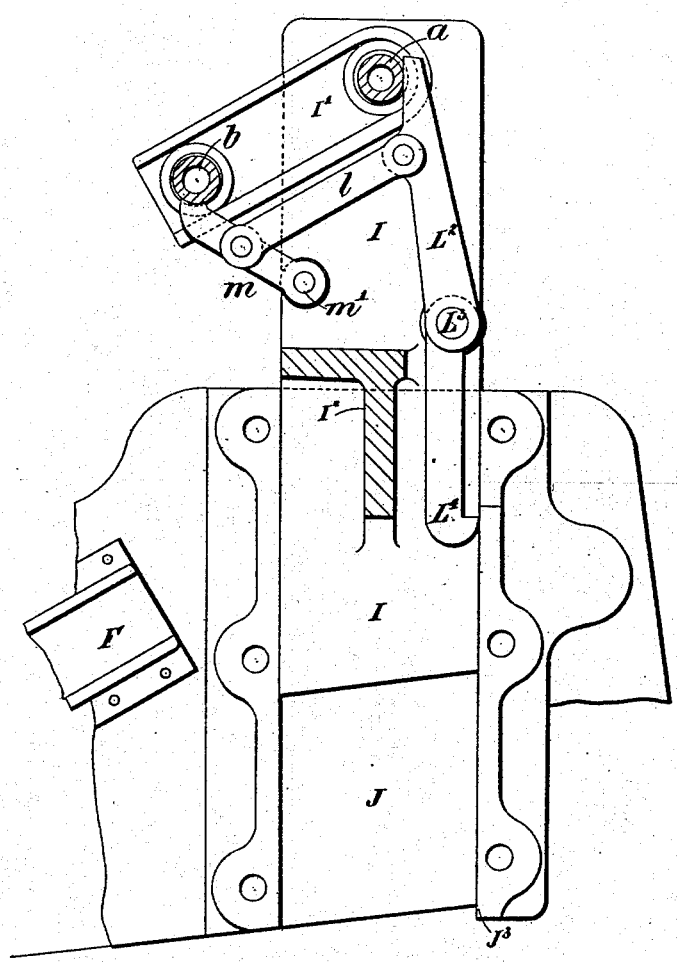
Figure 10:
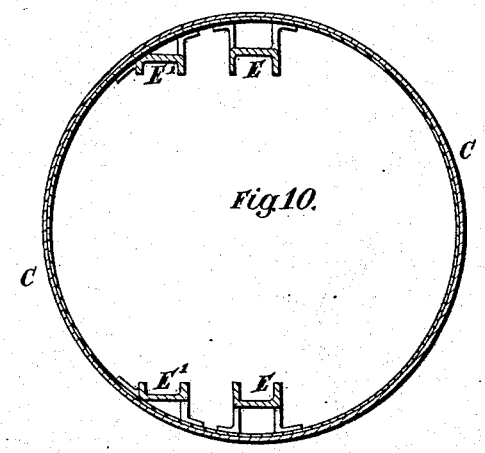
Figure 11:
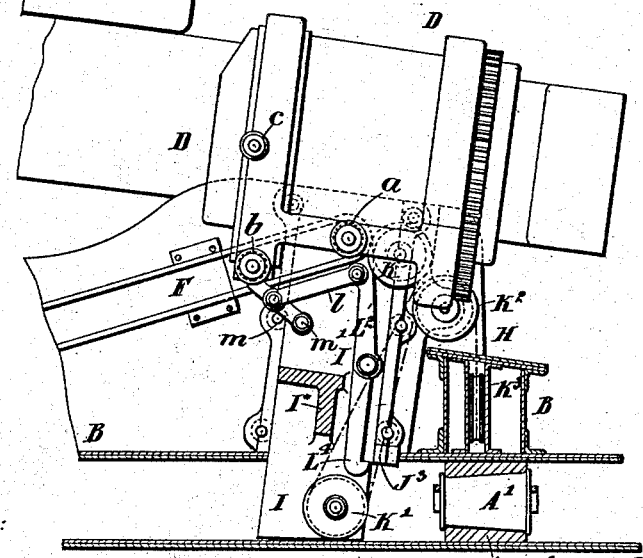
Figure 12:
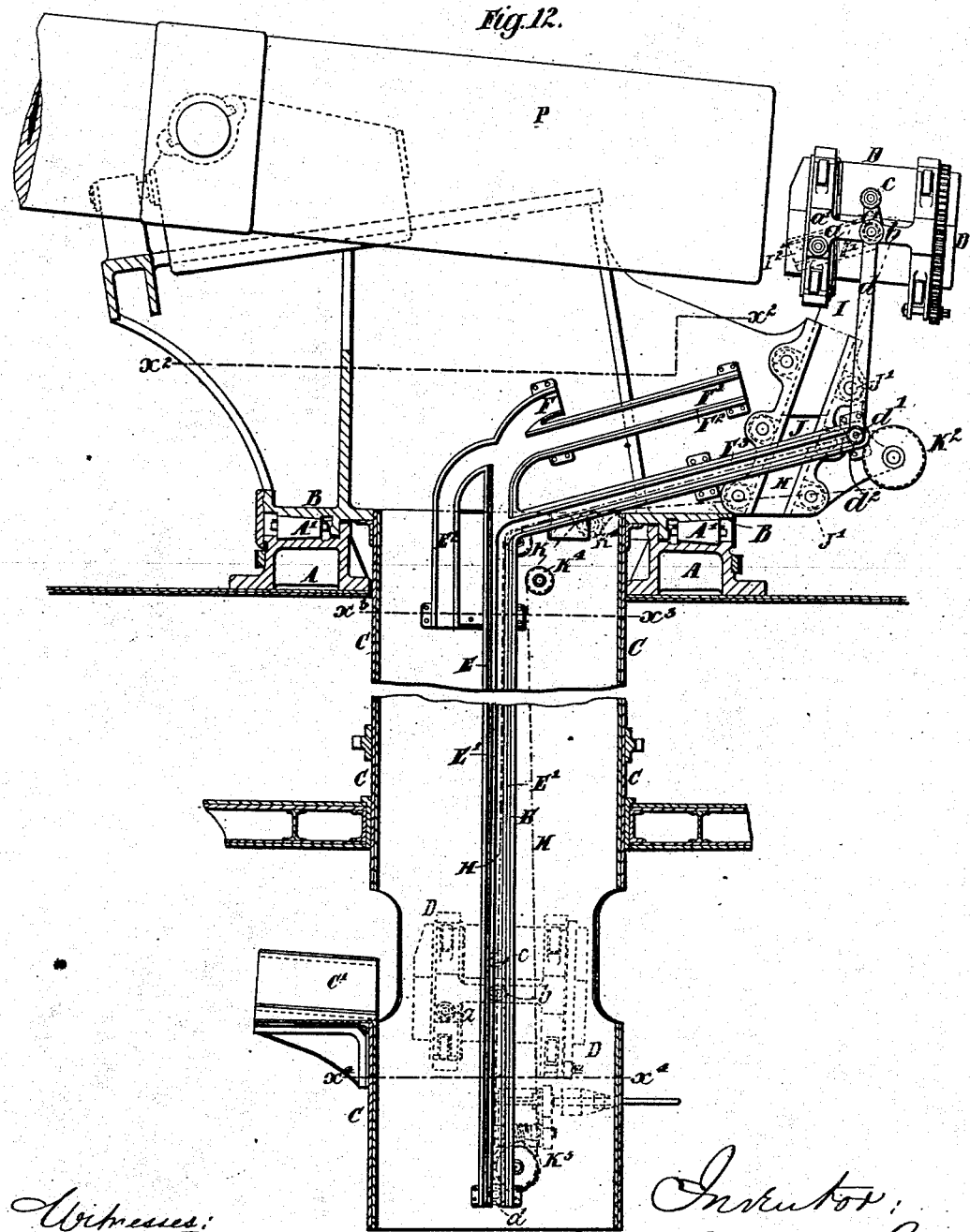
Figure 13:
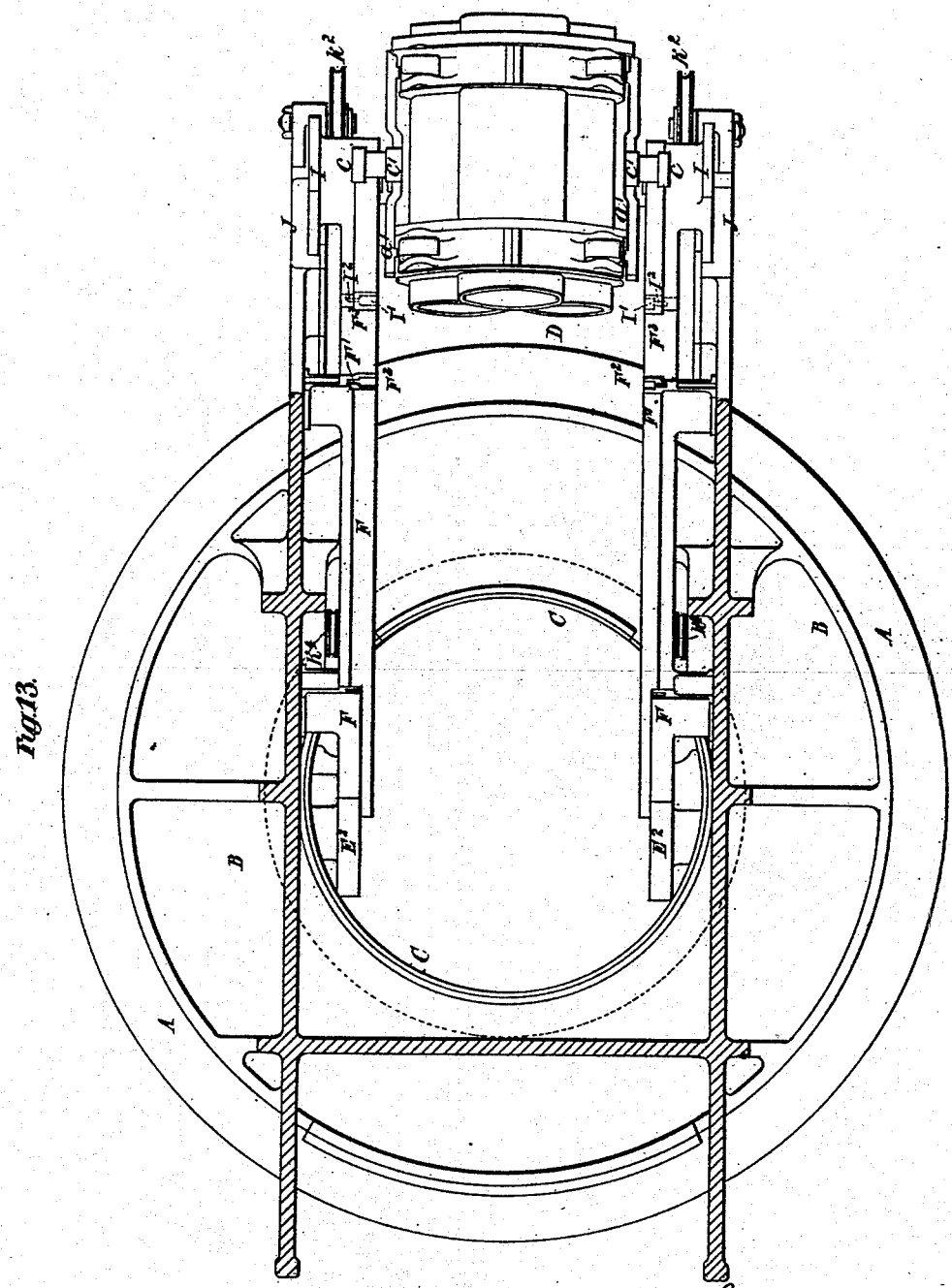
Figure 14:
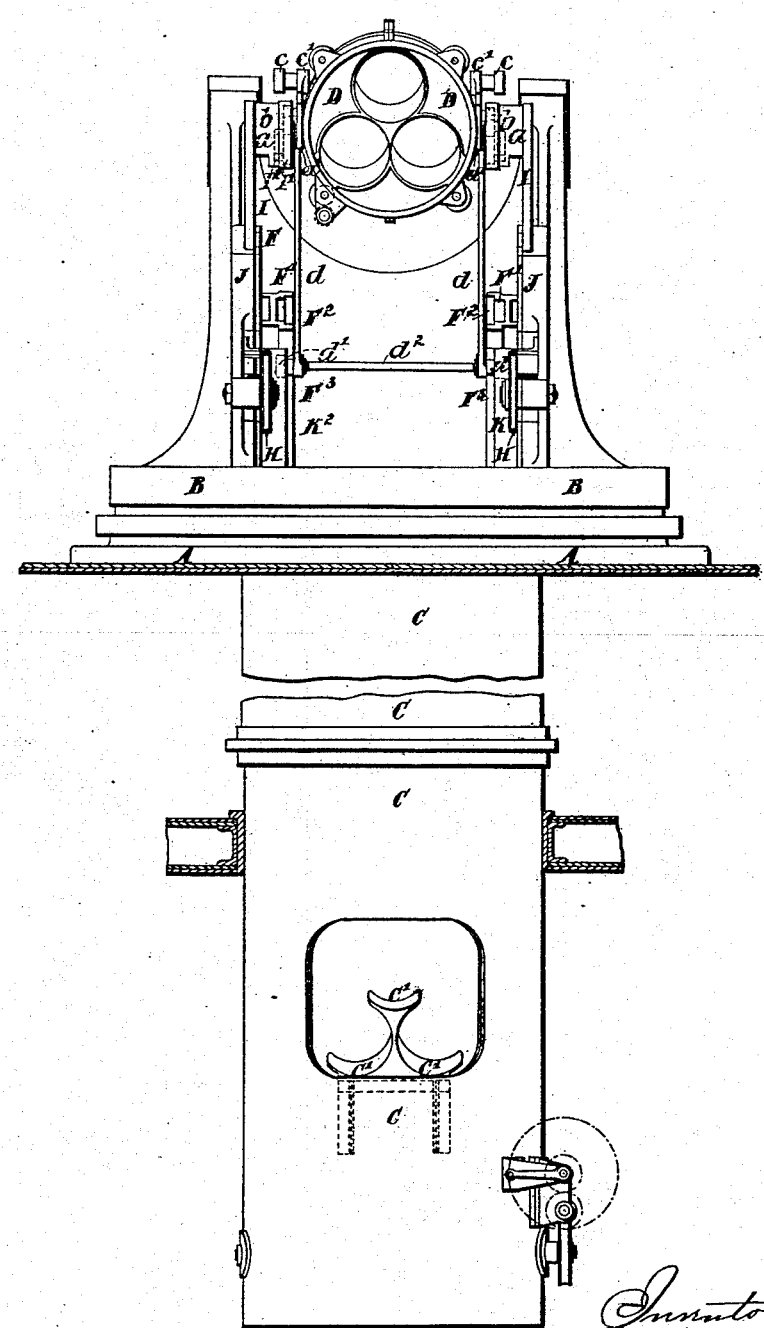
Figure 15:
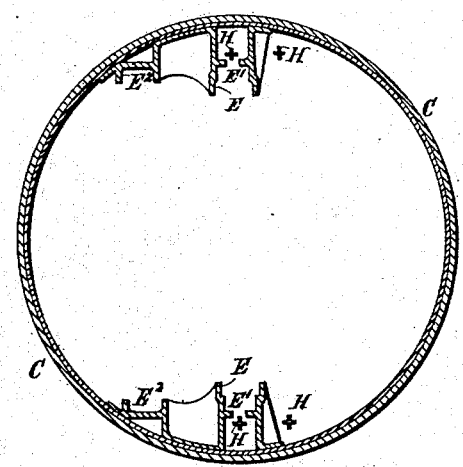
Figure 16:
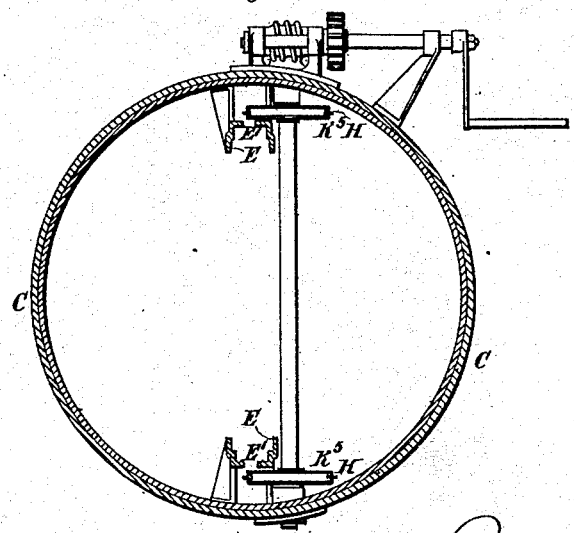
Figure 17:
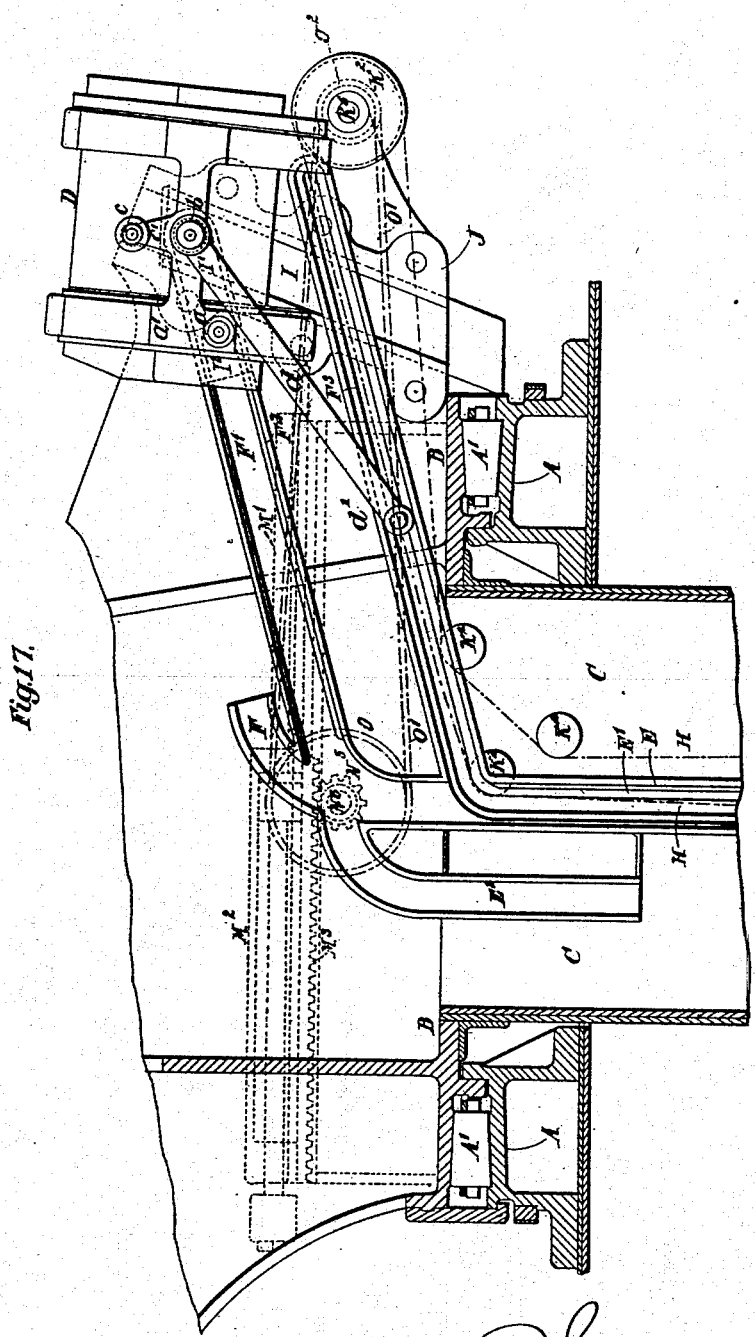
Figure 18:
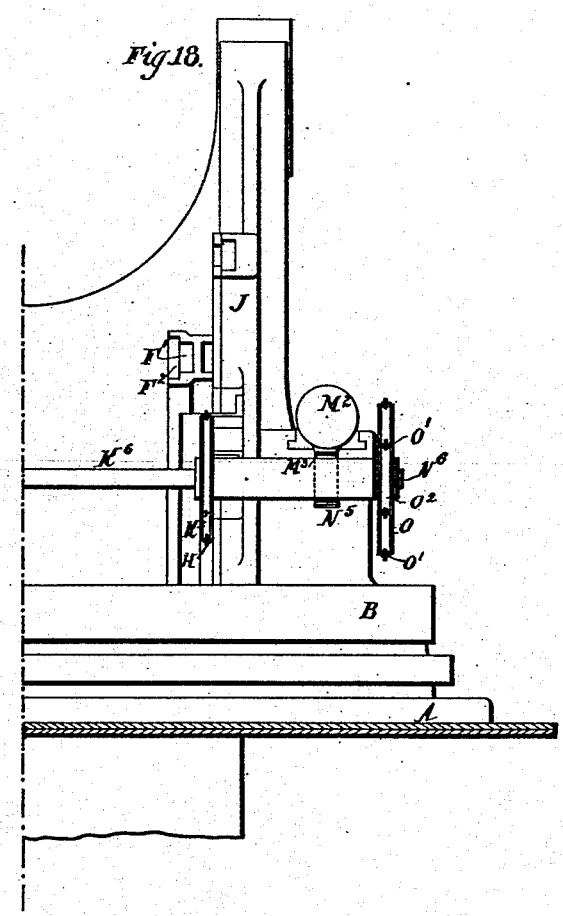
Figure 19:
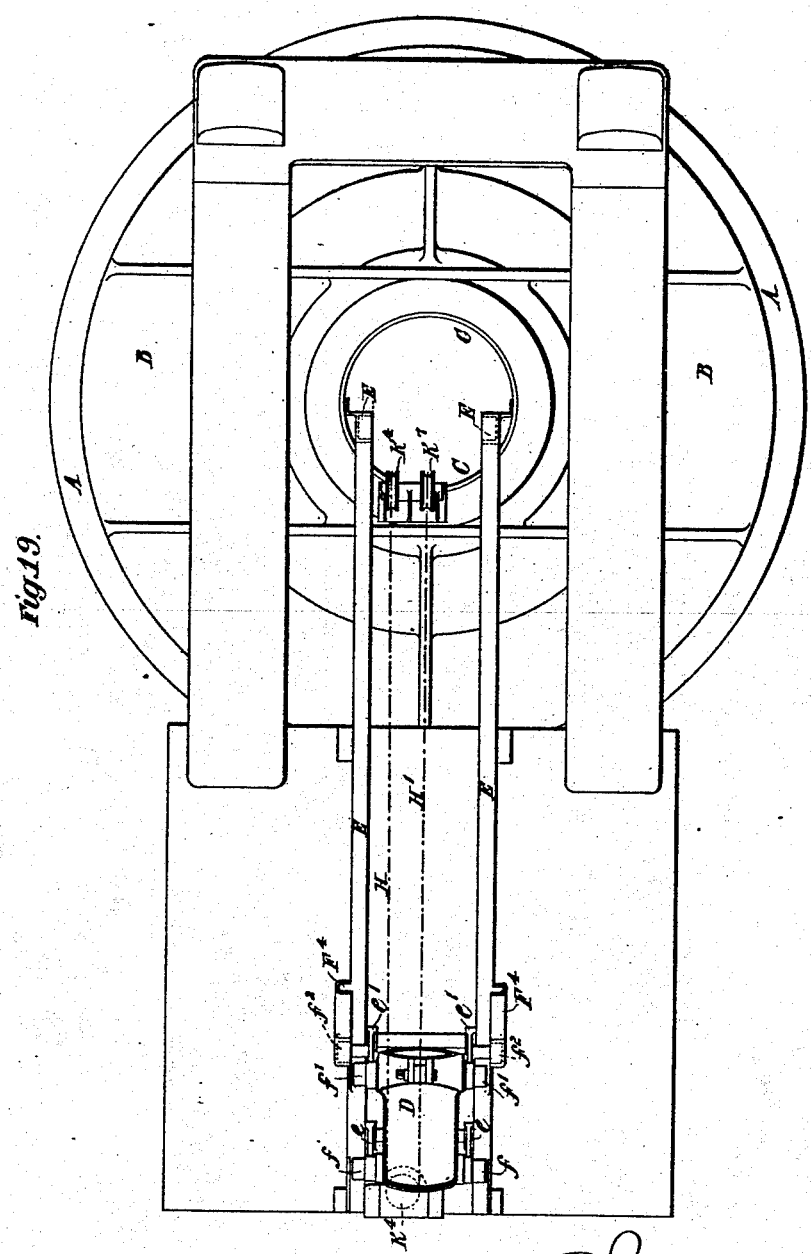
Figure 22:
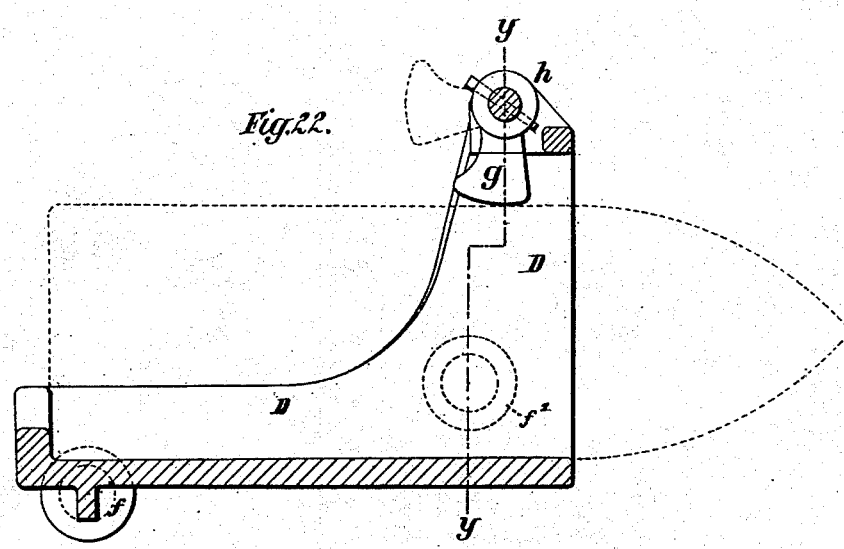
Figure 23:
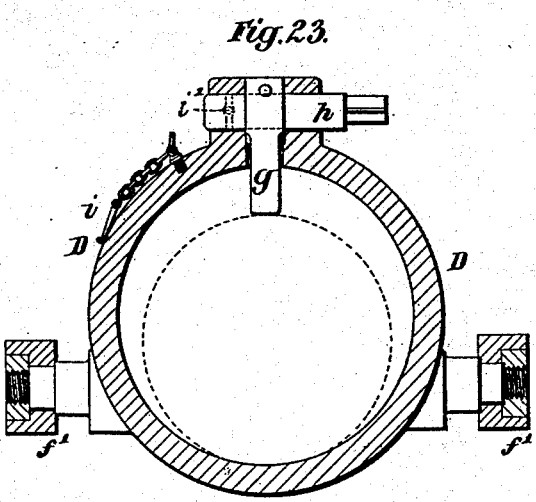
Figure 24:
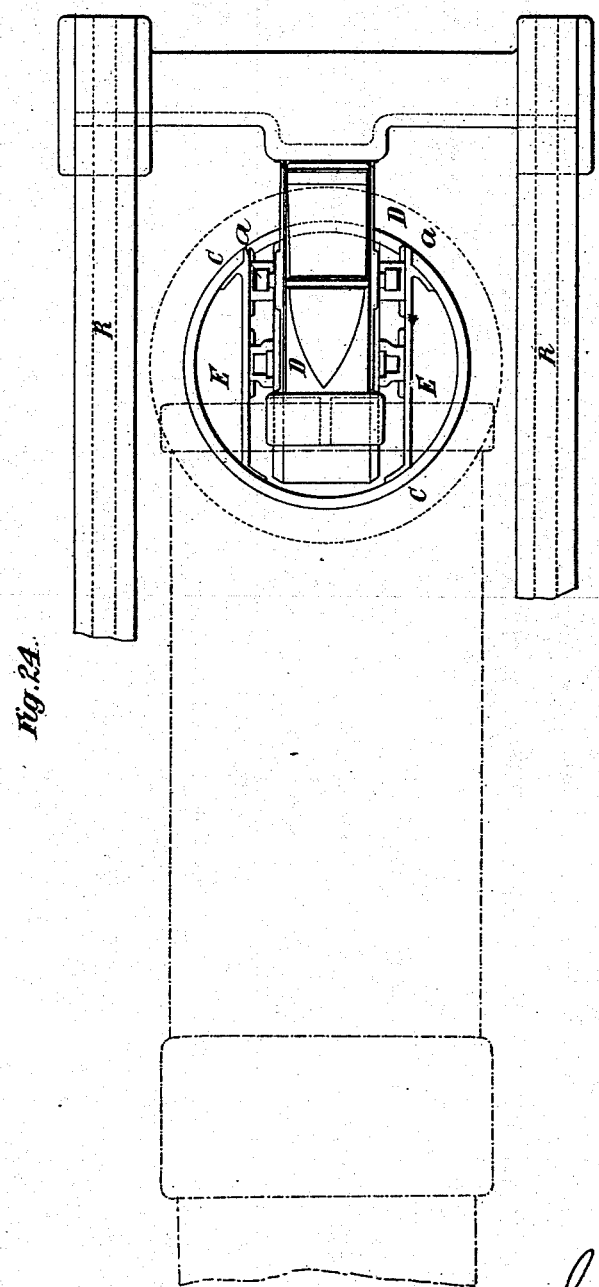
Figure 31:
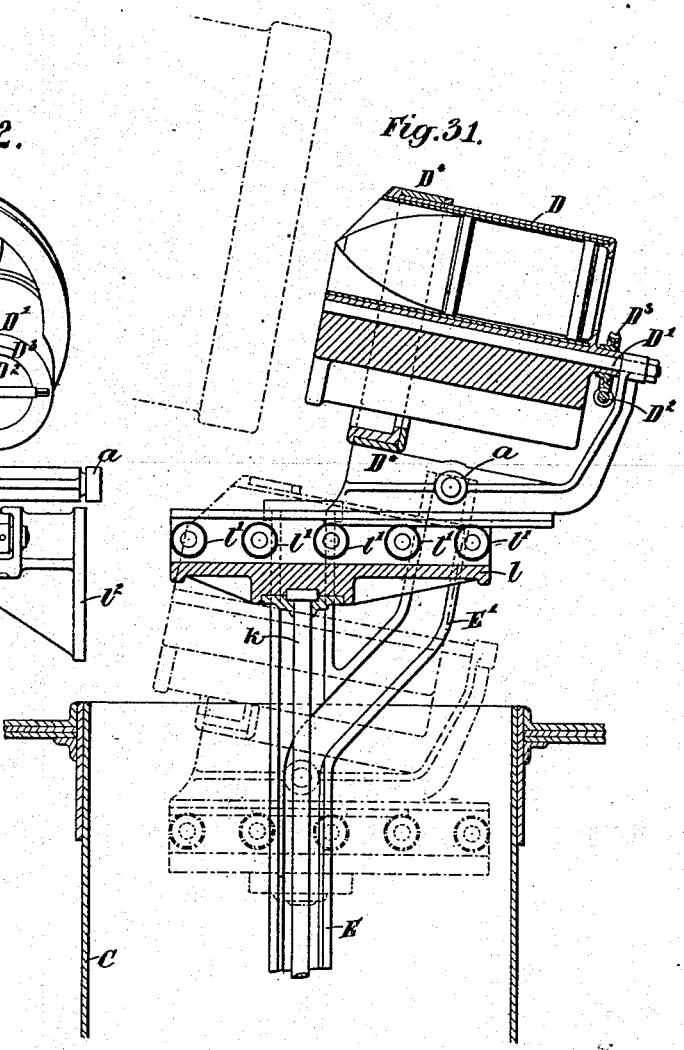
Figure 37:
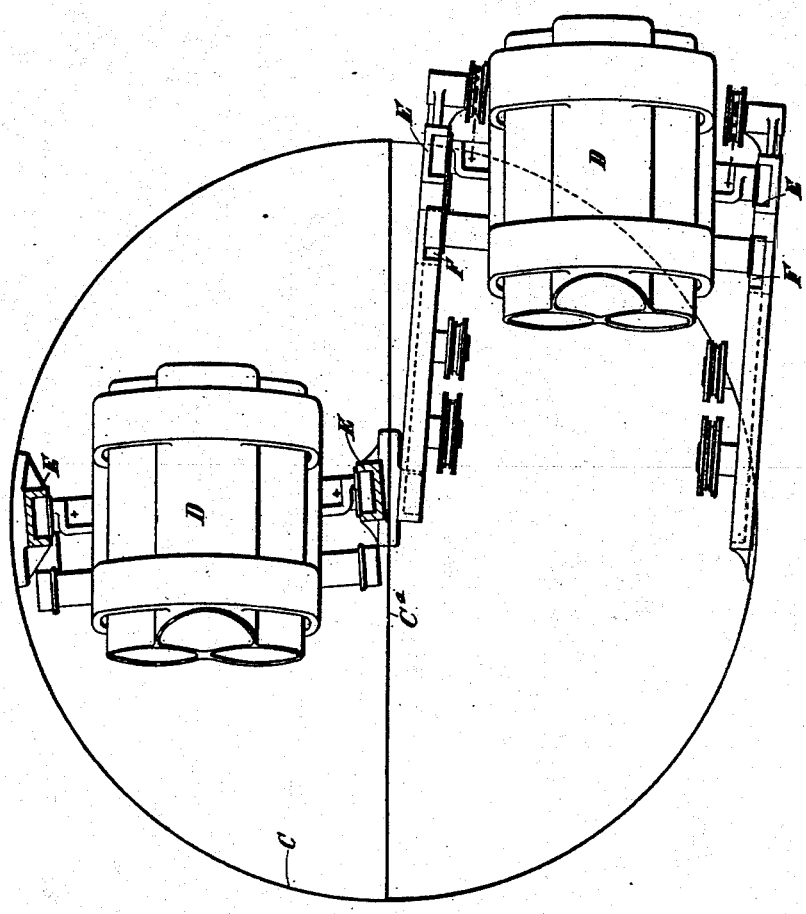
Figure 38:
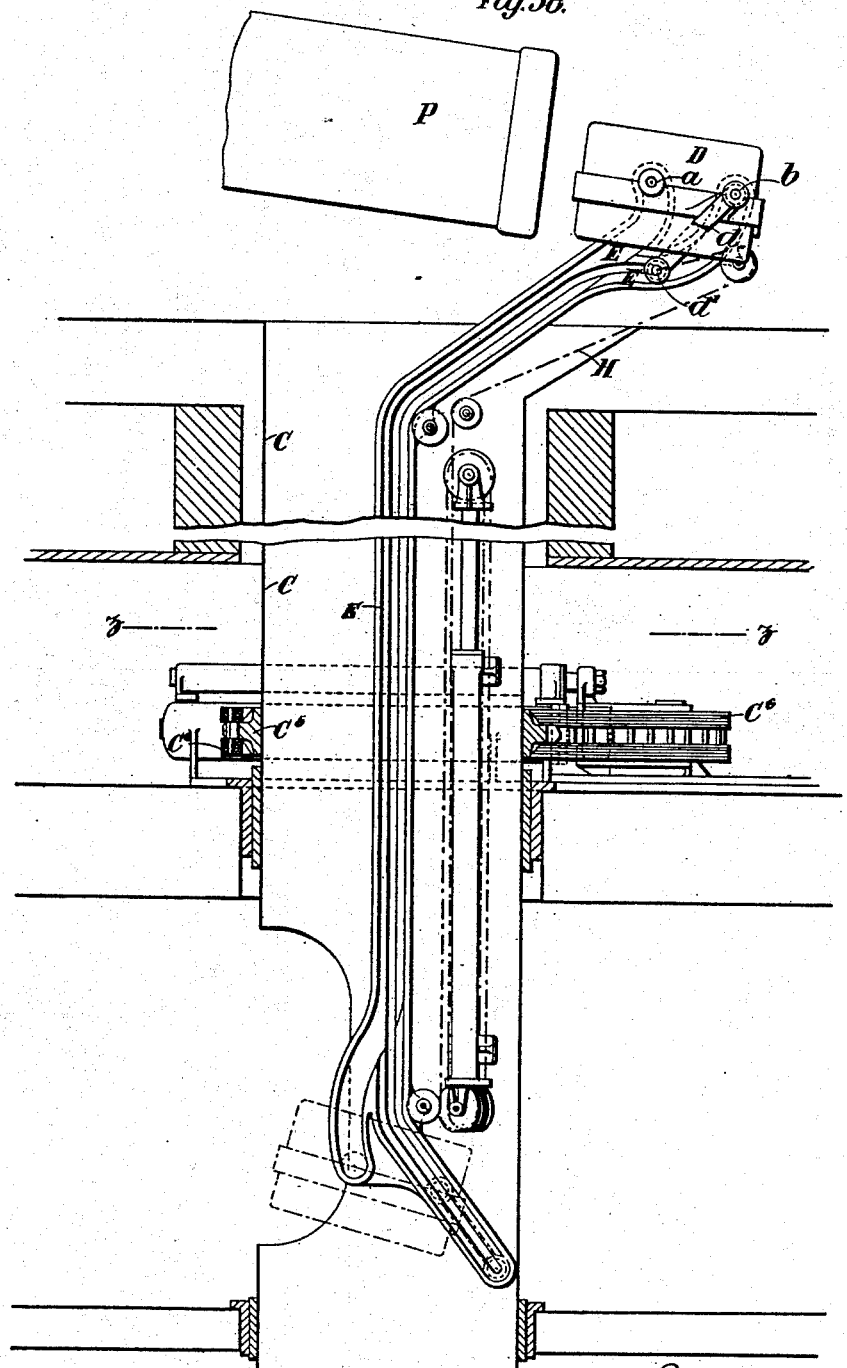
Figure 39:
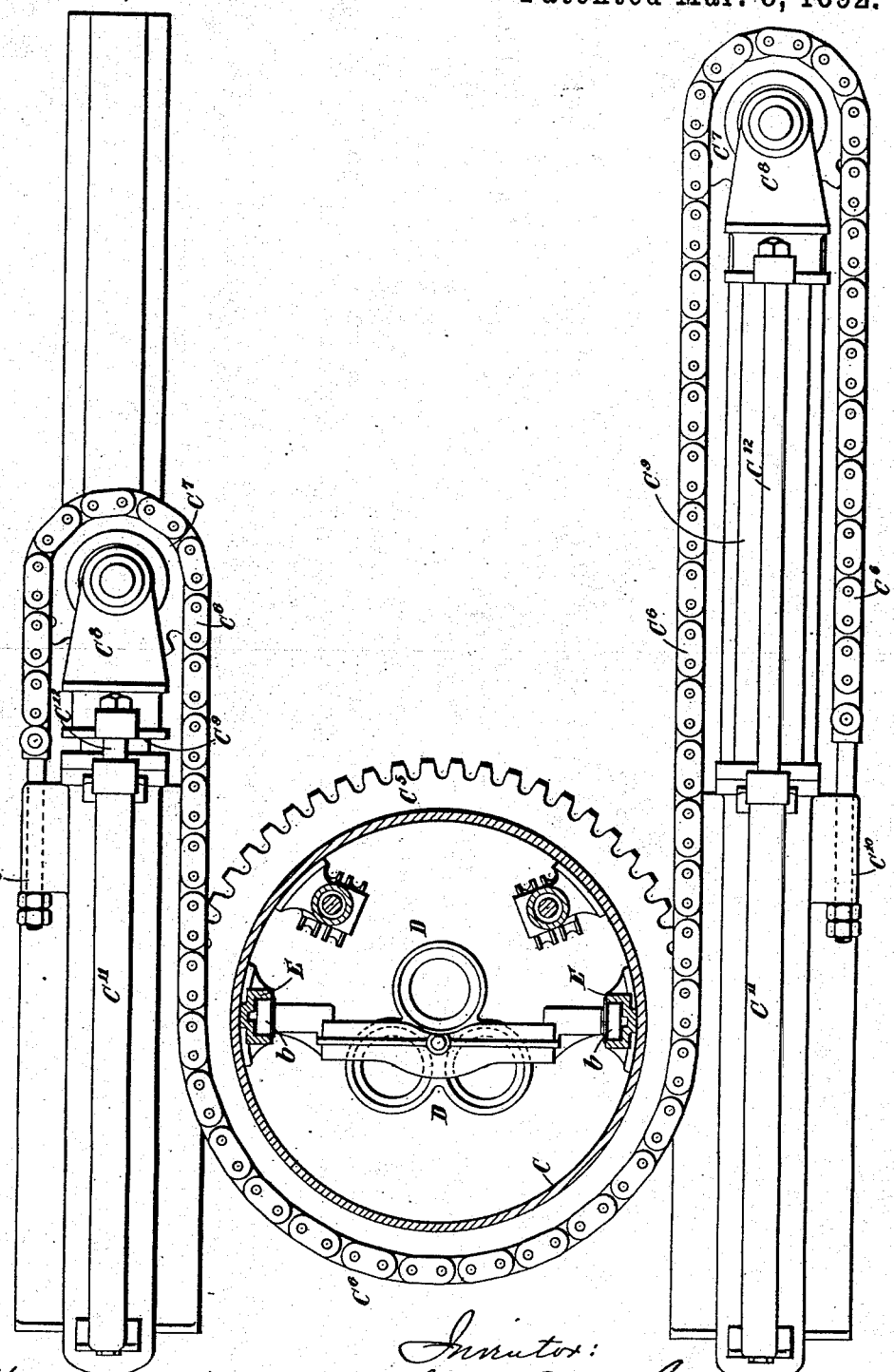
Figure 40:
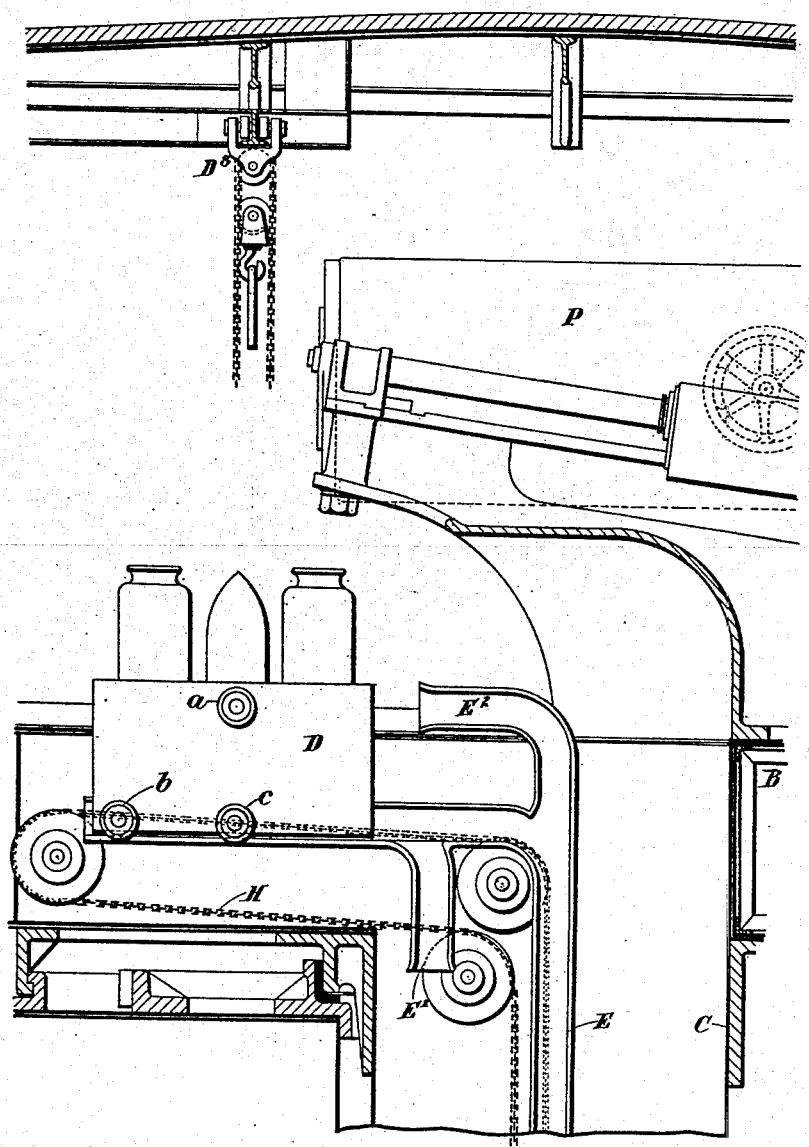
Figure 41:
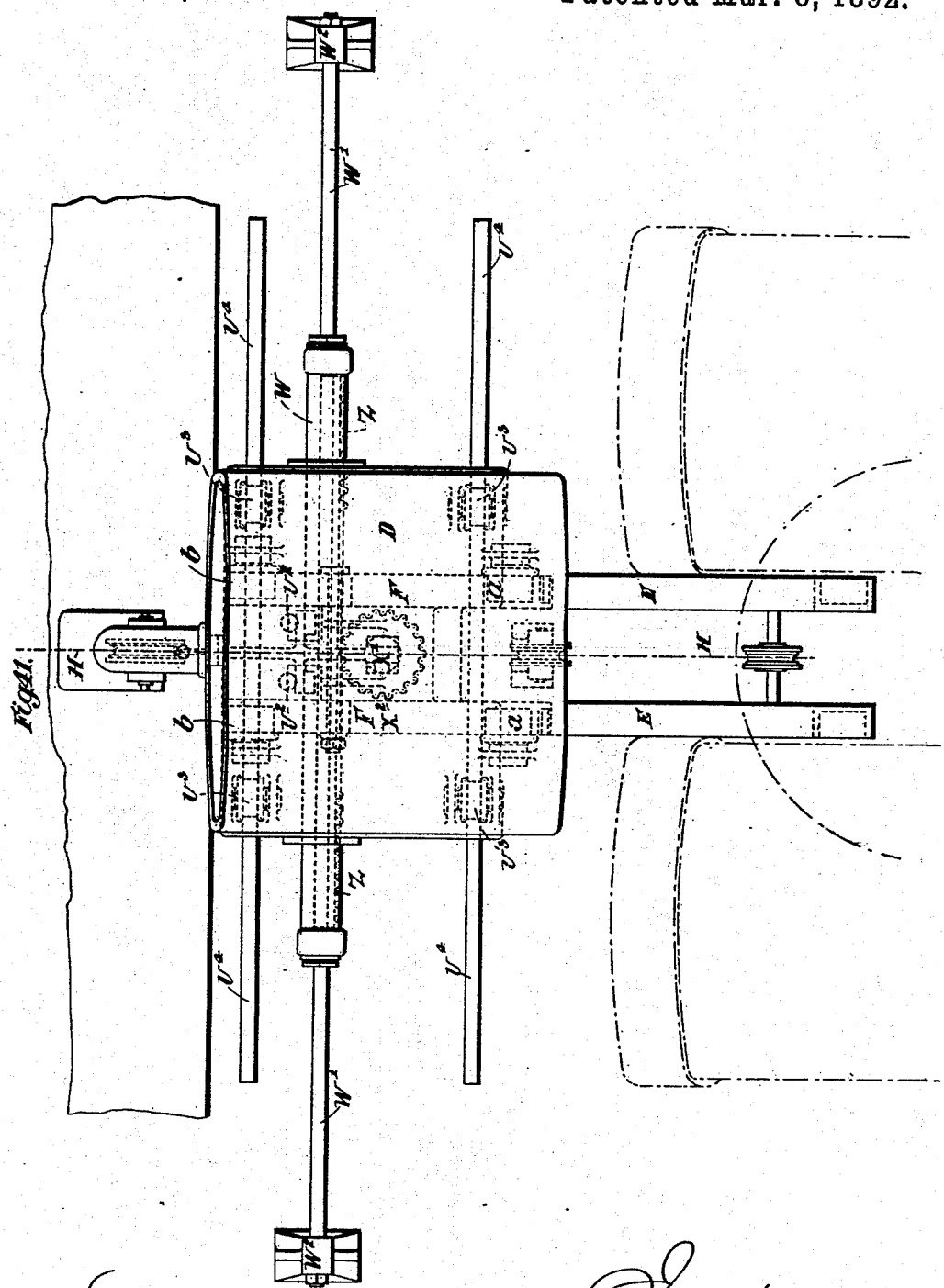
Figure 42:
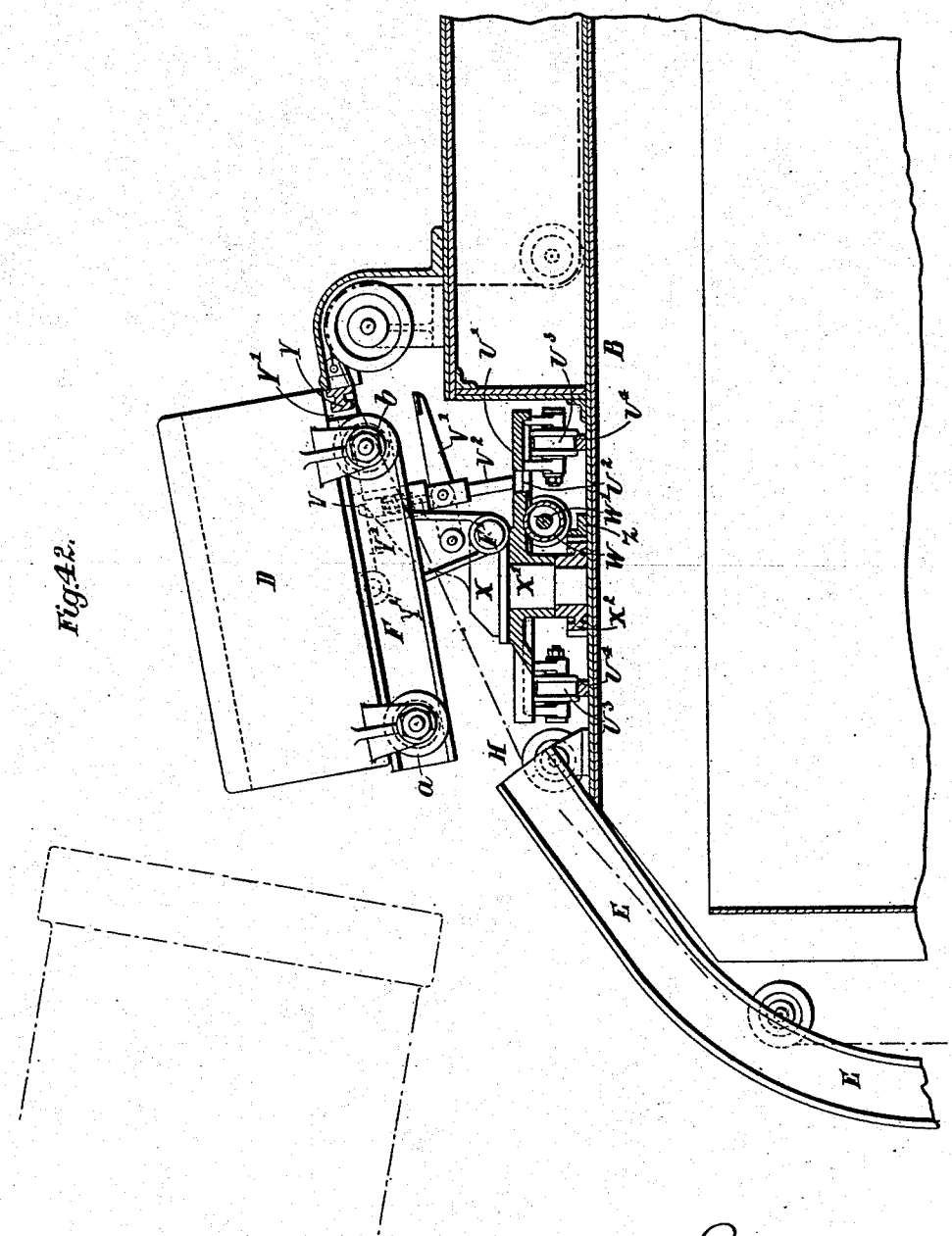

In the accompanying drawings, Figure 1 is a plan, and Fig. 2 a sectional side elevation, of a gun-mounting provided with apparatus constructed according to my present improvements, showing the charge-carrier, hereinafter described, in position behind the breech of the gun. Fig. 3 is a rear elevation of the said mounting, partly in transverse section. Fig. 4 is a horizontal section on the line $x\ x$, Fig. 2, drawn to an enlarged scale. Fig. 5 is a sectional side elevation, also drawn to an enlarged scale, showing the charge-carrier in the position which it occupies when it has been lowered with the slide hereinafter described. Fig. 6 is a plan, Fig. 7 a sectional side elevation, and Fig. 8 a rear elevation, partly in transverse section, illustrating another form or modification of my improved apparatus, the charge-carrier being shown in position behind the breech of the gun. Fig. 9 is a sectional side elevation, drawn to an enlarged scale, illustrating details of construction, some of the parts being removed. Fig. 10 is a horizontal section on the line $x'\ x'$, Fig. 7. Fig. 11 is a sectional side elevation showing the charge-carrier in the position which it occupies when it has been lowered with the aforesaid slide. Fig. 12 is a sectional side elevation of another gun-mounting having my present improvements applied thereto. Fig. 13 is a plan, partly in horizontal section, on the line $x^2\ x^2$, Fig. 12, drawn to an enlarged scale. Fig. 14 is a rear elevation of the apparatus illustrated in Figs. 12 and 13. Fig. 15 is a horizontal section on the line $x^3\ x^3$, Fig. 12. Fig. 16 is a horizontal section on the line $x^4\ x^4$, Fig. 12. Fig. 17 is a sectional side elevation illustrating another form or modification of my apparatus. Fig. 18 is a rear elevation of part of the apparatus illustrated in Fig. 17. Fig. 19 is a plan, Fig. 20 a sectional side elevation, and Fig. 21 a rear elevation, illustrating another modification of my invention. Fig. 22 is a vertical longitudinal central section, and Fig. 23 a transverse section on the line $y\ y$, Fig. 22, showing details of construction. Fig. 24 is a plan, and Fig. 25 a sectional side elevation, of a revolving turret, showing another form or modification of my apparatus. Fig. 26 is a sectional side elevation, drawn to an enlarged scale, showing details of construction of a telescopic lift, hereinafter described, for raising the projectile and powder-charges into position behind the breech of the gun, and also of an apparatus which I term a "distributer" for supplying water under pressure to the movable hydraulic gear of the mounting. Fig. 27 is a vertical central section of the said lift and distributer, and Fig. 28 a plan of the same, both drawn to a still further enlarged scale. Fig. 29 is a vertical central section, and Fig. 30 a front elevation, showing another modification of my charge-elevating apparatus. Fig. 31 is a vertical central section, and Fig. 32 a rear elevation, illustrating another modification of the said apparatus. Fig. 33 is a sectional side elevation illustrating another modification of my invention. Fig. 34 is a sectional side elevation, and Fig. 35 a transverse section on the line $y'$ $y'$, Fig. 34, showing another modification of my said invention. Fig. 36 is a sectional side elevation showing another modification of my charge-elevating apparatus; Fig. 37, a plan showing a similar arrangement to that shown in Fig. 36, adapted for use with two guns mounted side by side. Fig. 38 is a sectional side elevation showing another form or modification of the said charge-elevating apparatus. Fig. 39 is a plan, partly in horizontal section, on the line $z\ z$, Fig. 38, showing means for training the gun through the medium of the central tube. Fig. 40 is a sectional side elevation illustrating a further modification of the said apparatus. Figs. 41 to 46 are different views illustrating a still further modification thereof, and Fig. 47 is a vertical central section illustrating a still further modification of the said invention.

A is the racer or roller-path, A' are the rollers, and B is the rotating platform or turn-table, of the gun-mounting, which is supported on the said racer through the medium of the said rollers.

C is the central tube, through which the ammunition is raised and which is arranged to be rotated with the said platform or turn-table and forms a central pivot therefor.

D is the charge-carrier.

In the central tube C are arranged grooved ways or guides E E' for directing the movements of the charge-carrier D.

In the apparatus shown in Figs. 1 to 5 the charge-carrier D is provided on each side with three rollers $a\ b\ c$, which are fitted to rotate upon pins or studs fixed in the said carrier, and are arranged to move along the said guides E E', as hereinafter described. The guides E E' extend vertically upward from the magazine or deck from which the ammunition is to be raised to or nearly to the upper end of the tube C, where they are curved and merge into guides F, extending rearwardly from the said tube. Inclined brackets or guides G are provided above the guides F, for the purpose hereinafter specified.

At the rear end of the guides F there is a strong slide I, consisting of two bars or cheeks united by a cross-bar or transom I* and fitted to slide up and down in vertical or nearly vertical guides J. The guides F are continued along this slide—that is to say, the said slide has formed in it curved guides I', the lower ends of which when the slide is down coincide with the rear ends of the guides F and form a continuation of the said guides, as shown in Fig. 5, and which are closed at their upper ends. The said slide also has other curved guides $I^2\ I^3$, for the purposes hereinafter specified.

A lever L is pivoted at L' to the transom I* of the slide I. One arm of this lever bears against a roller M, carried by a bracket M', firmly attached to the turn-table or platform B. The other arm of the said lever is adapted to bear against a surface D' on the under side of the carrier D for the purpose of supporting the said carrier when in the position shown in Fig. 2.

H H are traction or elevating chains for raising and lowering the carrier D. These chains are secured to the axles of the rollers $a$ or at points in line with the axis thereof and are passed around grooved pulleys K K' on the slide I and around grooved pulleys $K^2$ on the frame $J^2$, to which the guides J are secured. The said chains then pass around grooved pulleys $K^3$ on the turn-table or platform B and are connected with hydraulic rams $M^2$ or with other suitable apparatus for elevating the charge-carrier through the medium of the said chains. The chains H pass over the pulleys K and under the pulleys K', so that they will act to raise the slide and carrier, as hereinafter described. The hydraulic rams or other elevating apparatus may be placed upon the movable upper portion or platform of the gun-mounting or in the tube, or in any other convenient position. Grooved pulleys $K^4$ are provided for guiding the chains H during the raising and lowering of the charge-carrier in the tube C.

To insure and facilitate the descent of the charge-carrier D in the inclined guides F, a return-chain N is coupled to hooks $D^2$ on the charge-carrier and is passed around a guide-pulley N', carried by a bracket $N^2$. This chain is arranged to be acted upon either by a hydraulic ram or by a counter-weight or by other convenient means. It is preferably attached to a short rod or bar $N^3$, which rests in the hooks $D^2$, as shown, and the bracket $N^2$ is formed with a notch or recess $N^4$, wherein the said rod or bar $N^3$ will be left when the carrier descends in the tube C, so that when the carrier is again raised the hooks $D^2$ will lift the said rod or bar out of the said notch or recess. The return-chain N will, therefore, be automatically coupled to the hooks $D^2$ at the termination of the ascent of the charge-carrier within the tube C and uncoupled or released therefrom at the commencement of the descent of the said carrier within the said tube.

In the ascent and descent of the charge-carrier within the tube C the rollers $a$ move in the guides E and the rollers $b\ c$ move in the guides E'. When the said carrier in its ascent has passed the bend or curve of the guides E E', the rollers $a\ b$ move along the inclined guide F, the carrier D (while the rollers $b$ are passing from the guides E' into the guides F) being supported on the brackets or guides G by the rollers $c$, which pass from the guides E' through apertures E*. When the carrier arrives at or near the rear of the gun-mounting, its rollers $a\ b\ c$ enter the guides I' I$^2$ I$^3$ in the slide I—that is to say, the rollers $a$ enter the guides I', the rollers $b$ also enter the guides I' and pass into the guides I$^2$, and the rollers $c$ enter the guides I$^3$, all of these rollers moving in and along the said guides to the ends thereof without moving the slide. When the said rollers have arrived at the upper or closed ends of the said guides I' I$^2$ I$^3$, the elevating-chains H, acting upon the pulleys K', carried by the slide I, raise the said slide, and thereby bring the charge-carrier to the desired position behind the breech of the gun, where it is automatically locked by a bolt or other suitable device, so that the ammunition may be rammed into the gun. During the greater part of this movement the charge-carrier is held or supported in the slide I by means of the lever L, one arm whereof bears, as above stated, against the roller M, which at the commencement of the ascent of the slide causes the said lever to turn upon or about its fulcrum or pivot L' until its upper end bears against the surface D' of the said carrier, as shown in Fig. 2.

To permit the descent of the charge-carrier, it is only necessary to open the discharge or exhaust of the hydraulic ram and release or disengage the locking-bolt or other device, when the said carrier will descend, under the action of gravity and of the power applied to the return-chain, into the required position for receiving another charge from the magazine.

The gun P is held in a cradle Q, which engages with and moves upon slides on beams R, pivoted at R' to the turn-table or platform B and connected with a hydraulic press S for raising and lowering the said beams to elevate and depress the gun. Suitable recoil-brakes T are provided, the piston-rods T' of which are secured to the beams R.

In the modification of my invention illustrated in Figs. 6 to 11 the slide I is made with one guide I' on each side thereof, and these guides are adapted to receive the rollers $a\ b$. The guides E' are extended upward above the guide F and merge into horizontal or inclined guides F'. I employ, moreover, the means hereinafter described for preventing upward movement of the slide I before the rollers $a$ of the charge-carrier have arrived at the closed ends of the said grooves I', which movement would take place if the weight of the said slide were sensibly less than that of the charge-carrier—that is to say, I pivot to the said slide at L$^3$ levers L$^2$, the upper ends of which extend to about the center of the upper or closed ends of the guides I', and which are provided at their lower ends with hooks or catches L$^4$, adapted to engage with shoulders J$^3$ at the lower ends of the guides J when the slide I is down. These hooks or catches hold down the said slide I until the rollers $a$ on the charge-carrier, arriving at the closed ends of the guides I', act upon the upper ends of the said levers L$^2$ and turn the said levers upon or about their pivots, thereby automatically disengaging the said hooks or catches L$^4$ from the shoulders J$^3$ and releasing the slide I, which can then rise with the charge-carrier. It is obvious that other suitable means may, if desired, be provided for this purpose.

To prevent displacement of the charge-carrier during the ramming home of the ammunition and during the ascent and descent of the said carrier with the slide, I provide a suitable automatic locking device. For instance, I employ connecting-rods $l$, coupled to the levers L$^2$ and to arms or levers $m$, pivoted at $m'$ to the said slide. When the rollers $a$ arrive at the closed ends of the guides I' in the slide and move the levers L$^2$ to disengage their hooks or projections L$^4$ from the shoulders J$^3$, the said arms or levers $m$ are moved so that their free or outer ends bear against the under side of the rollers $b$ on the charge-carrier. In the upward and downward movement of the slide the lower ends of the levers L$^2$ bear against the inner surface of the guides J, so that the carrier will be held rigidly in place in the slide until the latter terminates its downward movement and the said hooks or projections L$^4$ again engage with the said shoulders J$^3$ on the guides J. Therefore, when the apparatus is used at sea the said charge-carrier, while supported by the slide and its adjuncts, will not not be liable to displacement by the rolling or pitching of the ship or vessel. Moreover, the carrier cannot be moved out of the slide while the guides I' do not coincide with the guides F.

In the modification of my invention illustrated in Figs. 12 to 18 the charge-carrier D has on each side of it rollers $a\ b\ c$, which in the elevation of the charge-carrier within the tube C move in guides E E' E$^2$. These guides have at the top of the tube horizontal or nearly horizontal branches or shunts F F' F$^2$ F$^3$ extending toward the rear of the gun-mounting. The rollers $a\ c$ are carried by arms $a'\ c'$, firmly attached to the said carrier. The rollers $a\ b\ c$ are arranged in combination with rods or arms $d$, which are pivoted at their upper end upon the axles of the rollers $b$ and which carry at their lower end rollers $d'$, arranged to move in the guides E' F$^3$. The chains H for elevating the charge-carrier are attached to the axle $d^2$ of the said rollers $d'$ or to the arms $d$ in any convenient manner. At the rear of the guides F' F$^2$ there is a slide I fitted to move in vertical or nearly vertical guides J, provided with rollers J' for facilitating the movement of the said slide. Each of the bars or cheeks forming the slide I has grooves or guideways I' I², which at their rear or upper ends are closed and which are so arranged that when the said bars are in their lowest position in the guides J the said grooves or guideways I' I² will coincide with the guides F' F², as shown by dotted lines in Fig. 17. The elevating-chains H pass over pulleys K² K⁵ and are kept in place by a series of guide-pulleys K⁴. Motion is imparted to the said elevating-chains either by means of worm-gearing at the lower end of the central tube C, worked by hand, steam, hydraulic, or other power, or by means of a vertical ram, or by other suitable means. C' is a bracket attached to the tube C near the lower end thereof and formed with inclined surfaces or guides for facilitating the placing of the projectile and charge in the carrier D when the same is in the position shown in dotted lines in Fig. 12. A similar bracket is provided in the central tube of the apparatus shown in Figs. 1 to 5 and of that shown in Figs. 6 to 11. When the elevating-chains H are moved in the proper direction, the charge-carrier D is raised from position shown by dotted lines in Fig. 12, being supported and guided as it rises by the rollers $c$ $d'$ in the guides E' and by the rollers $b$ in the guides E. When the said charge-carrier arrives at or near the top of the central tube C, the rollers $a$ enter the guides E². The carrier D then moves toward the rear of the gun-mounting, the rollers $a$ $b$ $c$ moving in the guides or branches F F' F²—that is to say, the rollers $a$ $b$ move along the guides F' F² and the rollers $c$ move along the guides F. The rollers $d'$ on the rods or arms $d$ move upward in the guides E' and then along the guides F³ and with the force exerted upon them by the chains H are caused to push the charge-carrier to the rear of the gun-mounting. When the carrier has arrived at the extremity of the rearward guides F' F², its rollers $a$ $b$ enter the grooves I' I² in the upper end of the slide I, which then occupies such a position that its grooves I' I² form continuations of the guides F' F², as shown by dotted lines in Fig. 17. The travel of the rollers $a$ $b$ is arrested by the termination of the grooves I' I², and the rollers $d'$ continuing to move rearward in the guides F³ the slide I is by means of the connecting rods or arms $d$ raised in the guides J until the rollers $d'$ arrive at the closed ends of the guides F³. The charge-carrier therefore continues its upward movement and conducts the charge into the desired position at the rear of the gun, as shown in full lines in Fig. 12. For effecting the return of the carrier D to the lower end of the tube C the operations are reversed. A spring-pawl or other suitable device is preferably provided for retaining the charge-carrier and the slide I in position during the ramming of the charge into the gun. It will be seen that the raising and lowering of the charge-carrier are effected without releasing it from the control of the driving and guiding devices, and that the said charge-carrier is at all times held and controlled by at least two of its rollers on each side thereof—that is to say, during its vertical movement the rollers $b$ $c$ move in the guides E E'. At the bend the rollers $a$ enter the guides E², and after the change in the direction of movement the rollers $a$ $b$ move in the guides F' F² and then enter the grooves I' I² at the top of the slide I, so that the carrier, with the projectile or charge therein, is firmly supported while being raised into position behind the gun. It will also be seen that the entire movement of the charge-carrier from the position indicated by dotted lines to that shown in full lines in Fig. 12, and vice versa, is effected by force applied to it solely through the medium of the chains H. It is obvious, moreover, that cables or ropes may be substituted for the said chains for the purpose of my invention.

I sometimes provide hydraulic apparatus, as shown in Figs. 17 and 18, for imparting the requisite motion to the elevating-chains H— that is to say, I employ a hydraulic ram M², arranged on the platform B, the piston-rod being fixed and the cylinder movable. The said cylinder has on it a rack M³, geared with a pinion N⁵, fixed on the shaft N⁶, on which is also fixed a pulley O. A chain O' extends from this pulley around a pulley O² on the shaft or axle K⁶ of the pulley K².

In the apparatus shown in Figs. 1 to 18 the charge-carrier D contains chambers for the projectile and powder-charges and is capable of being rotated, so as to bring the said chambers successively in line with the bore of the gun.

Figure 20:
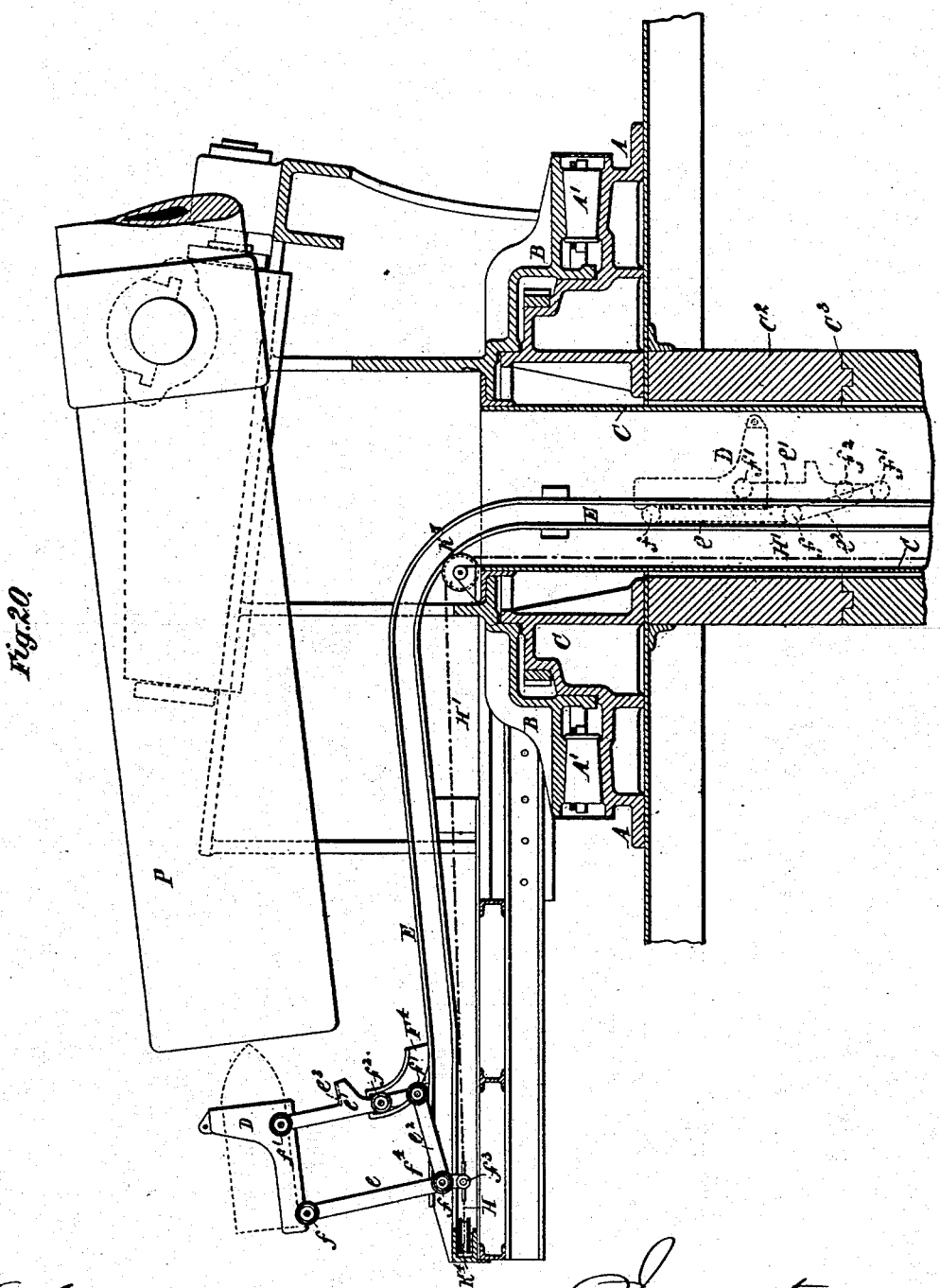
Figure 21:
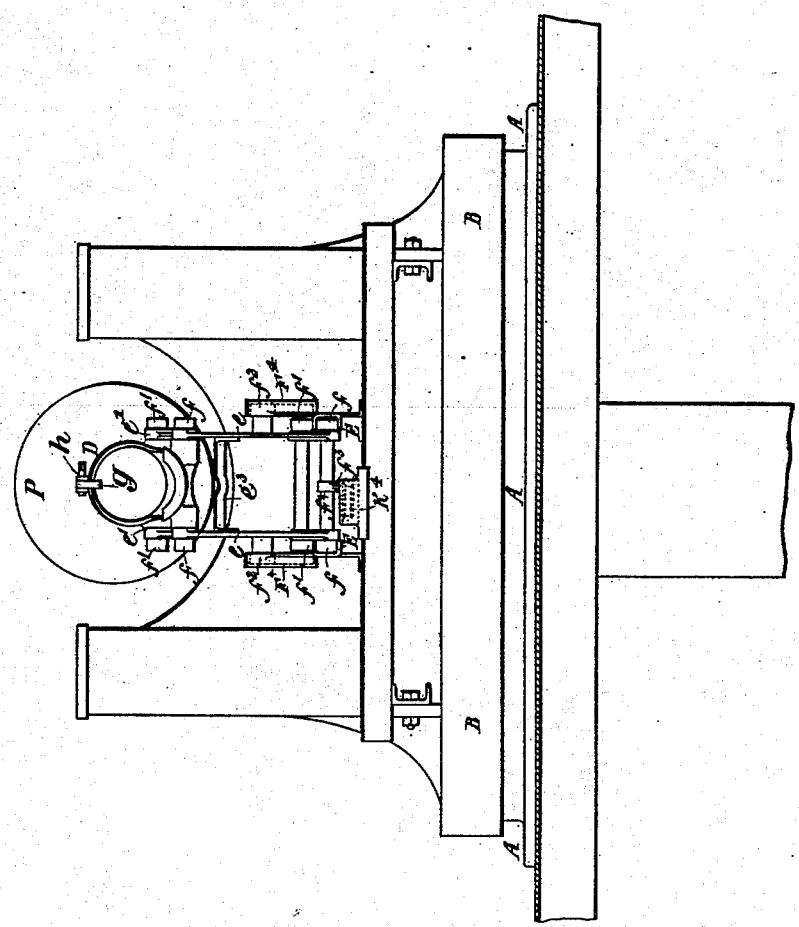

I sometimes modify the construction of the apparatus, as shown in Figs. 19, 20, and 21, in which the charge-carrier D takes up one portion of the charge in each ascent. This carrier is provided on each side with links $e$ $e'$ $e^2$, connected by hinge-joints to each other and to the charge-carrier, so as to form a parallelogram, the said parallelogram being provided with rollers $f$ $f'$ at the joints thereof and with rollers $f^2$ on the links $e'$. The said carrier is moved by means of chains H H', attached to an arm $f^3$, fixed on the axle $f^4$ of the lower rollers $f$. The chain H is passed around guide-pulleys K⁴ and the chain H' around a guide-pulley K⁷. The guides E are curved at the upper end of the tube C and extend toward the rear of the gun-mounting. In the elevation of the charge-carrier D within the tube C and in the rearward movement thereof the rollers $f$ move in the guides E, and the rollers $f'$ bear upon the outer surface of the said guides, the links $e$ $e'$ $e^2$ occupying the positions relatively to each other and to the said carrier indicated by dotted lines in Fig. 20. At or near the termination of the rearward movement of the charge-carrier the rollers $f^2$ on the links $e'$ enter curved or inclined guides F⁴, whereby in continuing its movement the carrier D is raised. The projectile and charge will thus be brought into line with the bore of the gun when the latter is in the loading position. The links $e'$ have firmly secured between them a cross-bar $e^3$ for supporting the charge or the projectile in the carrier during the vertical movement thereof. The device shown in Figs. 22 and 23 or any other suitable device is, moreover, provided for temporarily securing the projectile in the said carrier. The device shown in these figure consists of an arm or cam $g$, fixed upon a short rod or spindle $h$ and adapted when in the position shown in full lines to bear against the projectile, but capable of being turned or adjusted to the position shown by dotted lines in Fig. 22, so as to release the projectile and permit the ramming of the same into the gun. A pin $i$ is attached to the carrier D for insertion in apertures at $i'$ in the said carrier and in the spindle $h$ for the purpose of retaining the said cam in the position indicated by dotted lines. I prefer that the central tube above the water-line in an unarmored ship or vessel should be protected by armor composed of thick metal hoops or rings $C^2$, Fig. 20, jointed together, as shown at $C^3$, or in any other convenient manner.

To adapt my invention for gun-mountings in which the charge can be brought to the breech-end of the gun by a very limited rearward movement, I modify my said invention, as in Figs. 24 to 28, or as in Figs. 29 and 30. The elevating apparatus shown in Figs. 24 to 28 comprises a hydraulic press U, provided with two or more telescopic pistons or rams $k$ $k'$. The piston or ram $k$ carries a table $l$, provided with rollers $l'$, on which rests the charge-carrier D, designed to contain the projectile and the two half-charges of powder. The table $l$ is guided in its up-and-down movement by two slide-blocks $l^2$, working in the vertical guides E. The charge-carrier is guided in its movements by two side rollers $a$, which work in the guides E'. These guides branch off near the top of the tube C and, the rollers working in them, the charge-carrier is caused during the latter part of its upward movement to travel backward on the rollers of the table $l$, and is thus brought into position behind the breech of the gun, the rollers $a$ leaving the guides E'. When the projectile arrives in line with the axis of the gun, the pistons of the lift, being at the top of their stroke, arrest the ascent of the carrier, and the projectile is rammed home by hand or by any suitable mechanism. As the table $l$ of the lift is mounted on the top of the piston-rod or ram $k$, (which moves in line with the axis of the turret,) so as to be capable of turning on such rod, it is evident that whatever may be the position of the turret the charge-carrier, partaking of its movements, will always arrive behind the breech and in line with the axis of the gun. The charge-carrier that moves on the table at the top of the lift can be modified as well as the table itself and the guides, according to circumstances and according to the breech-closing mechanism employed.

Figs. 29 and 30 show a modification in which the charge-carrier D is pivoted at $m'$ to the extremity of a lever $m$, which is pivoted at $m^2$ to the table $l$. The guides E' for the rollers $a$ are curved in such a manner that as soon as these rollers leave the vertical part of the said guides the charge-carrier is slightly tilted and another roller $b$ bears on an inclined plane $b^*$. When the said roller $b$ reaches the top of the said inclined plane $b^*$, the lever $m$ rests upon the table $l$ and the charge-carrier is by the continued upward movement of the lift raised behind the breech of the gun in the proper position for loading. In this case the apparatus for ramming home the projectile and the two half-charges will have to be inclined. By inserting a lever or handspike in suitable holes $o\ o'$, provided in the charge-carrier D, the latter can by partially rotating it about its pivot $m'$ be brought to the proper position for ramming each component part of the charge into the gun.

Figure 32:
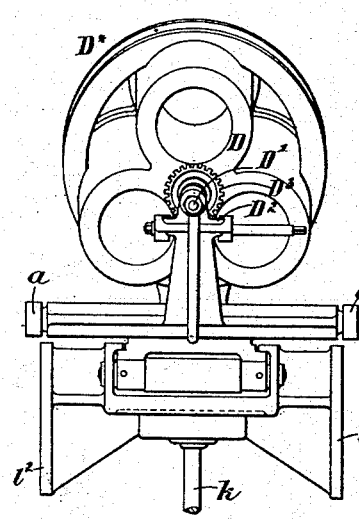
Figure 33:
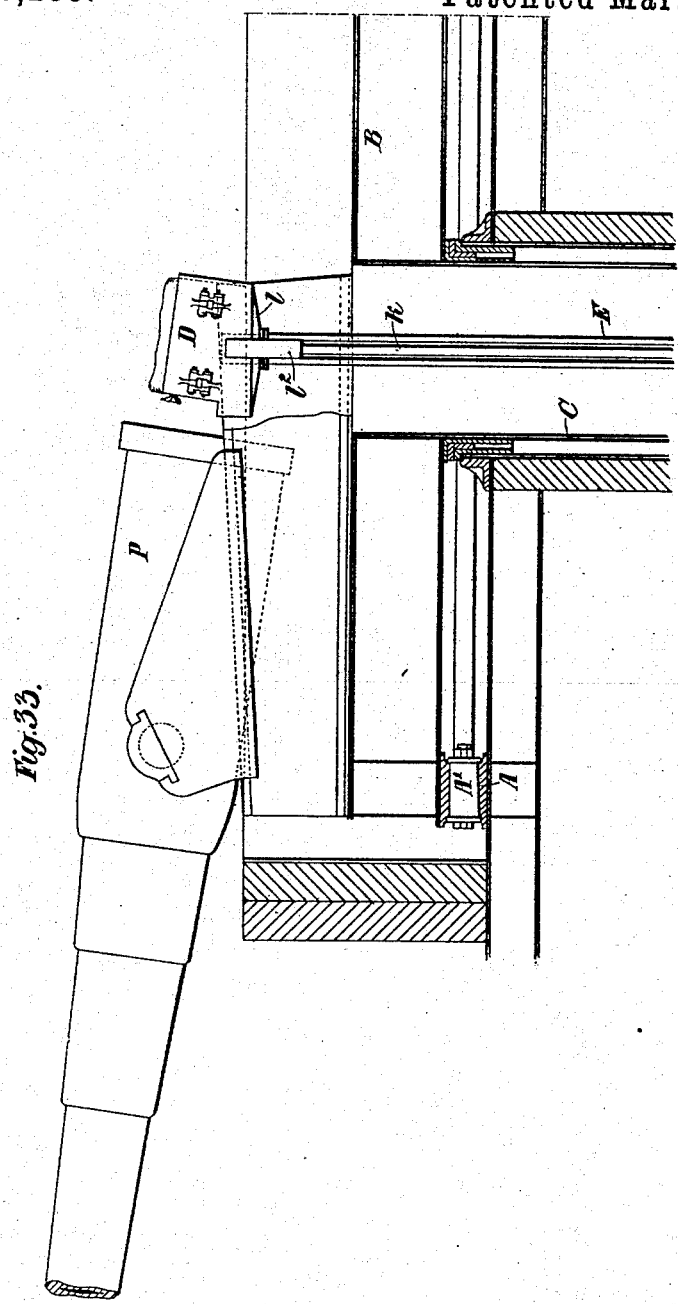

Figs. 31 and 32 show another arrangement of charge-carrier which may be employed in certain cases. In this arrangement the charge-carrier D revolves on a central rod or shaft D' and within a ring D*, and the revolving of the said carrier to allow each of the tubes (containing, respectively, the projectile and the two half-charges) to be brought in succession behind the breech can be effected either by means of a lever or handspike, as in the arrangement last above described, or by means of a worm $D^2$ and worm-wheel $D^3$, as shown.

Any suitable apparatus can be employed for elevating or training the gun for revolving the turret and ramming home the charge into the breech of the gun after it has been raised in the required position, as above described.

The pipe that conducts the liquid under pressure for working the apparatus in the revolving turret is connected with the distributing-box $p$, Fig. 27. The upper part of this box (which can turn around the cylinder U of the lift) is caused by the guides E E' to follow the revolving motion of the turret. The lower part $p'$ of the said box is fixed and receives the said pipe that conducts the liquid from the pressure-main or pumping-engine. The pipe that conducts the liquid into the revolving turret is bolted to a branch pipe $q$, and, rising parallel with the guides E, is divided at the top into three branches, one leading to the cylinder for elevating the gun, one to the apparatus for running the gun in and out, and the other leading to the mechanism for ramming the charge home. When the face of the breech does not overhang the edge of the central tube C, I employ guides for the charge-carrier, which are parallel to the axis of the said tube throughout their length, as shown in Fig. 33. When the breech overhangs the central tube, I sometimes arrange the charge-carrier as shown in Figs. 34 and 35. The charge-carrier D is mounted on a platform $D^4$, carried on small rollers $l'$, and arranged to be moved horizontally by means of a telescopic hydraulic press $D^5$ or by means of chains, screws, or other suitable means. This platform $D^4$ is supported upon a table $l$, guided in its movement up and down in the central tube C by the vertical guides E. When the charge-carrier D reaches the level of the gun-carriage, the said platform becomes hooked to the end of the hydraulic piston or ram $D^6$ and is at the same time disengaged from a catch which works the valve for introducing the liquid at the back of the said piston or ram. The stroke of this piston is so calculated that when at the outer end of the stroke the charge-carrier D is clear of the face of the breech. This position is shown in the drawings, Fig. 34, in full lines. When it reaches this position, the charge-carrier operates a valve which admits liquid under pressure into a vertical telescopic hydraulic press $D^7$, and the charge is thereby brought exactly opposite the breech of the gun. I also use this arrangement with a fixed central tube. In this case when the table or platform $l$ reaches the required level I make the charge-carrier turn about an axis or pivot, so as to place it in the proper position. It then hooks itself to the end of the piston of a horizontal hydraulic press and the manipulation is completed, as above described, as if the charge-carrier had been lifted inside a central tube movable with the platform of the gun-mounting.

To adapt the invention herein described for the loading of two guns mounted side by side on the same rotating platform or turn-table, I duplicate the guides, elevating-chains, and other parts, the charge-carrier for each gun being worked independently of the other charge-carrier. Each gun can thus be loaded and fired independently of the other gun.

In the arrangement shown in Fig. 36 I employ a charge-carrier D, which has three compartments for the projectile and powder-charges, arranged to turn about a common axis to bring the projectile and powder-charges successively into line with the bore of the gun. The said carrier D has on each side thereof two rollers $a\ b$ and an arm $c'$, provided with a third roller $c$. The rollers $b$ and $c$ are arranged to move in the guides E, which near the top of the central tube C are inclined and extend rearward or toward the breech of the gun. During the movement of the charge-carrier D in the said central tube C the said arms $c'$ are vertical or nearly vertical. The said guides E near their rear ends are bifurcated. Guides F are, moreover, provided for the rollers $a\ b$ of the said carrier D. The position and arrangement of these guides are such that the said charge-carrier D, after having cleared or moved around the lower edge of the breech of the gun, will be brought into the desired position for loading. The rollers $b$ and $c$ then abut against the closed ends of the guides E, and the elevating-chains, being kept taut, firmly retain the said carrier D in position during the loading.

$A^2$ are anti-friction rollers mounted vertically in rings $A^3$ and intended to diminish the friction between the pivot of the rotary platform or turn-table B and the step or bearing in which the said pivot works. The roller-rings $A^3$ are supported upon spherical or conical rollers $A^4$, fitted to rotate in the said bearing. When the central tube is of such length as to require lateral support at one or more parts thereof below the gun-mounting, I employ a similar arrangement of rollers for diminishing the friction at the part or parts where such support is provided. A hydraulic rammer $B^5$ is pivoted to the under side of the platform $B^6$, so that it will rotate with the gun-mounting, and will therefore always be in position for ramming the charge into the gun.

Fig. 37 shows the charge-elevating apparatus adapted for a gun-mounting in which two guns are mounted side by side. In this case two sets of guides E are provided within the central tube C and are placed close to each other, in order that the diameter of the said tube may be made as small as practicable. The said guides E are so arranged that they diverge from each other at the top of the tube C, so that when either of the charge-carriers D is moving rearward from the said central tube it will also move laterally while remaining parallel to the axes of the guns, and will thus arrive at the loading position behind the breech of the gun. The working of each of the charge-carriers D is effected by means of chains H or their equivalents attached to hydraulic presses arranged vertically within the central tube or horizontally on the platform or turn-table or by other suitable means. The central tube is made with a partition $C^4$, extending diametrically across it, or it is provided with other suitable means for supporting the guide-bars therein.

In a further modification of the charge-elevating apparatus (illustrated in Figs. 38 and 39) the revolving charge-carrier D is provided on each side with two rollers $a\ b$. On the axles of the rear pair of rollers $b$ are pivoted arms or connecting-rods $d$, the lower ends of which are provided with rollers $d'$ and are connected with the elevating-chains H. The axis of rotation of the charge-carrier during its movement in the tube C is vertical, the point of the projectile being uppermost. The said rollers move in suitable guides E, which at the top of the tube are inclined toward the rear of the mounting and are bifurcated or divided into curved branches to conduct the charge-carrier D into position behind the breech of the gun. The guides are so formed that the charge-carrier, after having cleared the breech of the gun, will be gradually turned about the axis of the forward pair of rollers $a$ until the rear rollers $b$ abut against the ends of the corresponding branches of the guides E. The carrier will then be retained firmly in position during the loading of the gun, provided the chains H are kept taut. After the loading has been performed the charge-carrier D descends under the influence of gravity, the rollers $d'$ at the lower ends of the connecting-rods $d$ and the rollers $b$ at the rear of the said carrier first descending and then the forward rollers $a$. The lower ends of the vertical guides E are also bifurcated or divided and are so formed that the carrier D when it has terminated its downward movement will turn about the axis of the forward rollers $a$ until it occupies a convenient position for the placing of the ammunition therein. Hydraulic presses for working the chains H are placed in the tube C, or the said presses may be placed on the platform, or other suitable means of imparting motion to the said chains may be employed. The central tube has fixed thereon a toothed wheel or ring $C^5$, having passed around and geared with it a chain $C^6$. The chain $C^6$ is passed around and geared with toothed wheels $C^7$, carried in suitable bearings in the heads $C^8$ of the rams or plungers $C^9$ of hydraulic presses, for the purpose of training the gun by the rotation of the said tube C and the platform or turn-table B to which it is attached. The extremities of the chain $C^6$ are firmly attached at $C^{10}$ to lugs provided upon the cylinders of the said hydraulic presses or in any other suitable manner. Auxiliary or supplementary hydraulic presses $C^{11}$ of smaller dimensions than the main hydraulic presses are, moreover, provided and are arranged in combination with the aforesaid chain $C^6$ and with the said main hydraulic presses. The rams or plungers $C^{12}$ of the supplementary presses $C^{11}$ are connected to the heads $C^8$ of the rams or plungers $C^9$ and are constantly subjected to the pressure of the liquid from the pressure-main in such a manner that they will maintain a suitable tension upon the said chain $C^6$, and thus counteract any tendency to slackening thereof during the operation of the main presses to train or traverse the gun.

Fig. 40 shows a modification of my invention, wherein the charge-carrier D is constructed in the form of a box provided on each side with rollers $a\ b\ c$, arranged to move in guides E E' $E^2$, and to be operated by hydraulic or other apparatus through the medium of chains H, which pass around suitable wheels or pulleys and are secured to the axles of the rollers $c$. The said carrier-box, having its rollers arranged in combination with the guides, will raise the projectiles and powder-charges in such a manner that they retain a vertical position throughout the movement of the said carrier. An overhead traveling crane or crab $D^8$ is provided, whereby the projectiles and powder-charges may be lifted out of the carrier D and moved into position behind the breach of either gun. This crab travels upon runner-ways which extend in line with and transversely to the axes of the guns and are provided with turn-tables for changing the direction of movement of the crab upon the said runner-ways.

Figs. 41 to 46 illustrate a modification wherein the charge-carrier D is constructed with three compartments arranged in the arc of a circle. The charge-carrier D is adapted for use with either one gun or with two guns mounted side by side. For this purpose I provide the said carrier D with rollers $a\ b$ on each side thereof, arranged to move in suitable guides E, and I use a single operating-chain H, which is coupled to the under side of the carrier near its center of gravity. At the upper extremities of the guides E are pivoted blocks or pieces F, having grooves to coincide with the said guides E and form continuations thereof. These blocks F are arranged to turn about a horizontal axis $F'$ and are supported upon a carriage $U'$. When the rear pair of rollers $b$ arrive at the rear ends of the guide-grooves in the pivoted blocks F, the elevating-chain, continuing to act, turns or rocks the said pivoted blocks F and the charge-carrier D in such a manner that the axis of the latter is brought to the same angle of inclination as the axis of the gun in the loading position, the inclination, however, being in the reverse direction. A pawl V maintains it in this position until it is permitted to rock in the reverse direction by acting upon the said pawl by means of a foot-lever or treadle $V'$, which can only be depressed when, after the loading of the gun, the charge-carrier is brought back to its position in front of the central tube, the tail-pieces $V^2$ of the foot-lever $V'$ then entering holes $U^2$, provided in the carriage $U'$, so that the said lever may be depressed and the pawl V disengaged. The carriage $U'$ is provided, moreover, with wheels or rollers $U^3$ and is arranged to travel upon ways or rails $U^4$. W is a hydraulic press, the cylinder of which is formed with or firmly attached to the carriage $U'$, and the piston-rod or plunger $W'$ of which extends through both ends of the said cylinder and is firmly secured at its extremities to suitable brackets $W^2$, attached to the platform or turn-table B. The grooved blocks F are pivoted to a bracket X, formed with a shaft or pivot-pin $X'$, on which is fixed beneath the carriage $U'$ a pinion $X^2$. This pinion is geared with a rack Z, firmly secured to the platform or turn-table B. The elevating-chain H is provided with a T-shaped piece Y, adapted to enter a corresponding groove in a rod $Y'$, attached at $Y^2$ to the carrier D. The said chain remains stationary during the lateral movement of the carriage $U'$, and the rod $Y'$ is disengaged from the said chain in the first part of such movement. When this disengagement is effected, the pinion $X'$ engages with the rack Z, and the shaft $X'$ is thereby turned upon or about its axis, thus causing the carrier D to make half a revolution in the proper direction to bring the ammunition into the desired position for ramming into the gun. After the loading is effected the carriage U' is moved back to the middle of the platform and in its return movement causes the charge-carrier D to turn half a revolution in the reverse direction. The chain then becomes again engaged with rod Y' on the said carrier D. The foot-lever V' is then depressed and the center of gravity of the carrier D and pivoted block F being in front of the aforesaid horizontal axis F' the said charge-carrier and block turn upon the said axis, and when the cylinder of the hydraulic apparatus for elevating the charge is opened to the exhaust the carrier descends along the guides E by gravity. The rack Z is arranged upon the platform or turn-table B in such a manner that the charge-carrier D can be turned into the desired position behind either of the guns to permit the loading thereof. The charge-carrier D is sometimes formed with a curved or segmental chamber, as shown in Figs. 44, 45, and 46, for containing the projectile and two half-charges of powder, so that the projectile may be placed in the center of the said chamber and a half-charge of powder on each side thereof; and I provide means whereby the powder-charges will be held up until after the projectile has been rammed into the gun and can then be released one after another, so that each powder-charge will in its turn roll or drop down to the loading position in the said chamber. In some instances the lower ends of the vertical guides E are provided with pivoted blocks or pieces formed with grooves which when the said blocks are in one position coincide with the lower ends of the said vertical guides and form continuations of the same. These blocks are arranged to turn or rock upon or about a fixed horizontal axis and to sustain the carrier during the charging thereof, the carrier being suitably constructed to prevent the sliding or slipping of the charge or load therefrom until it is in the loading position behind the gun. When force is applied to the elevating-chain, the said pivoted blocks or pieces are turned at the same time that the carrier is raised, and when the grooves in the said blocks are opposite the lower ends of the vertical guides the charge-carrier ascends in the latter. It then moves along the inclined parts of the guides, which are situated midway between the two guns.

In Fig. 47 I have shown another modification of my invention, wherein a hinged door or shutter B⁷ is provided in the floor of the turret for closing the aperture therein through which the ammunition is raised. In this case the charge carrier is so constructed and arranged that it will in its upward movement automatically raise and open the said door or shutter.

What I claim is—

1. A gun-mounting provided with a turning platform or turn-table and with guides secured to and turning with the said platform or turn-table and extending through a central opening therein to facilitate the raising of the ammunition into the loading position behind the breech of the gun, so that the gun may be loaded in any position to which it may be trained or while it is being trained.

2. A gun-mounting provided with a turning platform or turn-table, guides secured to and turning with the said platform or turn-table and extending through a central opening therein, and a rammer secured to the said platform or turn-table behind the breech of the gun and in line with the bore thereof, substantially as and for the purposes set forth.

3. A gun-mounting provided with a turning platform or turn-table, a central tube secured to and turning with the said platform or turn-table, and guides arranged within the said tube and extending through a central opening in the said platform or turn-table, substantially as and for the purposes set forth.

4. The combination, with a gun-mounting provided with a rotating platform or turn-table and with guides extending downward from a central opening in the said platform or turn-table, of a charge-carrier arranged to move in the said guides and means, substantially such as above described, for raising and lowering the said carrier, for the purpose above specified.

5. The combination, with a gun-mounting provided with a rotating platform or turn-table and with guides secured to and turning with the said platform or turn-table and extending through a central opening therein, of a charge-carrier arranged to move in the said guides, a slide at the rear ends of the said guides, adapted to receive the said carrier, and an elevating-chain attached to the said carrier and passed around pulleys on the said slide, substantially as and for the purposes set forth.

6. The combination, with the rotating platform or turn-table of the gun-mounting and the guides secured to and turning therewith, of the charge-carrier, the slide for receiving the same from the said guides, an elevating-chain attached to the said carrier and passed around pulleys on the said slide, and a lever for keeping the said charge-carrier in place in the said slide, substantially as and for the purposes set forth.

7. The combination, with the rotating platform or turn-table of the gun-mounting, of the vertical and rearward guides, the charge-carrier, and the slide adapted to receive the said charge-carrier at the termination of its rearward movement and to complete its guidance to the loading position and return it to the said guides under the control of the elevating-chain, substantially as and for the purposes set forth.

8. The combination, with the rotating platform or turn-table of the gun-mounting, of the vertical and rearward guides, the charge-carrier, the slide adapted to receive the said carrier, and means, substantially such as above described, for preventing the upward movement of the said slide until it is automatically released by the charge-carrier at the termination of its rearward movement, substantially as and for the purposes set forth.

9. The combination, with the rotating platform or turn-table of the gun-mounting, of the vertical and rearward guides, the charge-carrier, the slide adapted to receive the said carrier, and an automatic locking device, substantially such as above described, for preventing displacement of the carrier in the said slide, for the purposes specified.

10. The combination, with the rotating platform or turn-table of the gun-mounting, the vertical and inclined guides extending downward from the said turn-table, and the charge-carrier operated as above described, of the return-chain for facilitating the descent of said carrier through the inclined guides, substantially as and for the purpose set forth.

11. The combination, with the rotating platform or turn-table, the vertical and inclined guides, the charge-carrier operated as above described, and the return-chain for facilitating the descent of the said carrier through the inclined guides, of means for effecting the automatic release of the said carrier from and its re-engagement with the said chain, substantially as and for the purposes set forth.

12. The combination, with the rotating platform or turn-table and the vertical and inclined guides, of a charge-carrier and chains or ropes, through the medium of which are effected the entire movement of the said charge-carrier through or along the said guides and into the loading position behind the breech of the gun and the return movement of the said carrier, substantially as and for the purposes set forth.

13. The combination, with the rotating platform or turn-table, of the vertical and inclined guides, the charge-carrier, the pulleys at the top and bottom of the apparatus, and the chains or ropes passing around the said pulleys and coupled to the said carrier for the purpose of supporting, raising, and lowering the same, the said carrier being controlled by the said guides throughout its entire movement, substantially as and for the purposes set forth.

14. The combination, with the rotating platform or turn-table and the vertical and inclined guides, of the charge-carrier having pivoted arms provided with projections to engage with and adapt themselves to or follow the direction of the said guides, and chains or ropes which are coupled to the lower ends of the said pivoted arms and are adapted through the medium thereof to support, raise, and lower the said carrier, substantially as and for the purposes set forth.

15. The connecting-rod pivoted to the charge-carrier and provided with projections to engage with the vertical and inclined guides and connected to the elevating mechanism, in combination with one or more sliding bars or cheeks which receive the said carrier at the termination of its rearward movement and upon which the said connecting-rod will then act to raise the charge or projectile into the desired position behind the breech of the gun, substantially as and for the purpose set forth.

16. The combination, with the central tube through which the ammunition is raised, of armor composed of hoops or rings surrounding the said tube and jointed together, substantially as set forth.

17. The combination, with the turn-table and the central guides, of the charge-carrier, constructed with the chambers or compartments and means, substantially such as above described, for wholly or partially rotating it about its axis, substantially as and for the purposes set forth.

18. The combination, with the platform or turn-table, the central tube attached to and movable with the said turn-table, the guides, and the charge-carrier, of means, substantially such as above described, for moving the said charge-carrier vertically and horizontally to bring it into position behind the breech of the gun in the proper position for loading, substantially as described.

19. The combination, with a turning platform or turn-table and a central tube secured thereto and turning therewith, of a toothed wheel or chain-wheel fixed upon the said tube and connected with a motor for imparting rotary motion to the said tube and platform or turn-table, substantially as and for the purpose set forth.

20. The combination, with the turn-table, the central tube attached to and movable with the said turn-table, and the guides arranged within the said tube, of a toothed wheel or ring fixed upon the said tube, a chain passed around and geared with the said toothed wheel or ring, and hydraulic presses for operating the said chain to train the gun, substantially as set forth.

21. The combination, with the turn-table, the central tube attached to and movable with the said turn-table, and the guides arranged within the said tube, of a toothed wheel or ring fixed upon the said tube, a chain passed around and geared with the said toothed wheel or ring, hydraulic presses for operating the said chain to train the gun, and additional or supplementary hydraulic presses for maintaining the said chain under tension, substantially as and for the purposes set forth.

22. The combination, with the platform or turn-table, the central tube, the guides arranged therein, and the step or bearing for supporting the said tube, of the vertical rollers, the roller-rings carrying the same, and the horizontal rollers supporting the said roller-rings, substantially as and for the purposes set forth.

23. The combination, with the turning platform or turn-table and the guides extending downward from a central opening therein, of a charge-carrier the movement of which is controlled by the said guides and which comprises an outer frame or casing and chambers or compartments fitted to rotate therein about a common axis to bring them successively in line with the bore of the gun, substantially as and for the purpose set forth.

24. The combination, with the rotating platform or turn-table B, of the central tube C, secured to and turning with the said platform, the guides extending through the said tube, the charge-carrier D, arranged to move in the said guides, and means, substantially such as above described, for raising and lowering the said carrier in the said tube and for transferring the said carrier from the top thereof into the loading position behind the breech of the gun and back to the said tube, substantially as and for the purpose set forth.

25. The combination, with the rotating platform or turn-table B, of the central tube C, secured to and turning with the said platform, the vertical guides E E', secured to the interior of the said tube, the guides F, extending rearward therefrom and forming continuations of the said guides E E', the slide I at the rear end of the said guides F, provided with grooves adapted to register with the said guides F, the charge-carrier D, provided with rollers arranged to move in the said guides and to be received by the said slide at the termination of the rearward movement of the said carrier, and means, substantially such as above described, for raising the said carrier from the lower end of the said tube, and bringing it to the loading position behind the breech of the gun and for returning it to the charging position at the lower end of the said tube, substantially as and for the purpose set forth.

26. The combination, with the grooved slide I, adapted to receive the charge-carrier from the rearward guides, of the lever L, pivoted to the said slide, and the roller M, carried by a bracket M', secured to the turn-table of the gun-mounting, so that in the upward movement of the said slide the said roller will turn the lever L about its pivot until it comes in contact with the under side of the said carrier, substantially as and for the purpose set forth.

27. The combination, with the turn-table B, the central tube C, the guides E E', arranged within the said tube, the guides F, extending rearward from and forming continuations of the said guides E E', and the charge-carrier D, of the grooved slide I, arranged to move in guides J secured to the said turn-table and to receive the said carrier from the guides F, the rollers K K', carried by the said slide, the roller K², carried by the said turn-table, and the elevating-chain H, passed around the said rollers and secured to the said carrier, so that it will raise the said carrier in the said guides and transfer it therefrom to the slide and will then raise the said slide and carrier together, substantially as and for the purpose set forth.

In testimony whereof I have hereunto signed my name in the presence of two subscribing witnesses.

JEAN BAPTISTE GUSTAVE ADOLPHE CANET.

Witnesses:
J. L. RATHBONE,
R. J. PRESTON.